(12) United States Patent
Araki et al.

(10) Patent No.: US 9,300,471 B2
(45) Date of Patent: Mar. 29, 2016

(54) INFORMATION PROCESSING APPARATUS, INFORMATION PROCESSING METHOD, AND PROGRAM

(75) Inventors: Toshinori Araki, Tokyo (JP); Isamu Teranishi, Tokyo (JP); Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 14/131,404

(22) PCT Filed: Jul. 6, 2012

(86) PCT No.: PCT/JP2012/067294
§ 371 (c)(1),
(2), (4) Date: Jan. 7, 2014

(87) PCT Pub. No.: WO2013/005825
PCT Pub. Date: Jan. 10, 2013

(65) Prior Publication Data
US 2014/0143549 A1   May 22, 2014

(30) Foreign Application Priority Data
Jul. 7, 2011   (JP) .................. 2011-150595

(51) Int. Cl.
*G06F 21/62*   (2013.01)
*H04L 9/32*   (2006.01)
*G06F 17/30*   (2006.01)

(52) U.S. Cl.
CPC ........ *H04L 9/3242* (2013.01); *G06F 17/30625* (2013.01); *G06F 21/62* (2013.01)

(58) Field of Classification Search
None
See application file for complete search history.

(56) References Cited

U.S. PATENT DOCUMENTS

| 2006/0075228 A1* | 4/2006 | Black et al. | 713/167 |
| 2009/0300351 A1* | 12/2009 | Lei et al. | 713/165 |
| 2012/0317129 A1* | 12/2012 | Qayyum et al. | 707/754 |

OTHER PUBLICATIONS

International Search Report dated Sep. 4, 2012 in International Patent Application Publication No. PCT/JP2012/067294.
Eu-Jin-Goh, "Secure Indexes", May 5, 2004, [online],[searched on Jun. 21, 2011], pp. 1-19 Retreieved from the Internet:URL:http://crypto.sanford.edu/~eujin/papers/secureindex/secureindex.pdf>.
Y.-C.Chang and M.Mitzenmacher, "Privacy Preserving Keyword Searches on Remote Encrypted Data," Cryptology ePrint Archive, Report 2004/051, Feb. 2004. [online], searched on Jun. 21, 2011], Internet ,URL: http://eprint.iacr.org/2004/051.pdf.
B. Bloom, "Space/Time Trade Offs in Hash Coding with Allowable Errors," Communications of the ACM, vol. 13, No. 7, pp. 422-426, Jul. 1970.

* cited by examiner

*Primary Examiner* — Hadi Armouche
*Assistant Examiner* — Malcolm Cribbs
(74) *Attorney, Agent, or Firm* — McGinn IP Law Group, PLLC.

(57) ABSTRACT

An information processing apparatus includes: a storage unit that stores a tree structure formed by nodes, each of which is stores identification information identifying a document; and a registration unit that registers documents in the storage unit. The registration unit receives a document including identification information identifying the document and a word set and a key, registers the identification information in a leaf node in the tree structure, and calculates a secure index corresponding to identification information registered in each node from a root node to the leaf node in the tree structure based on the word set and the key. In addition, the registration unit generates a value calculated by adding the calculated secure index as a search index for the document and stores a value calculated by adding a search index generated for each of a plurality of received documents as a search index for the plurality of documents in the storage unit.

10 Claims, 17 Drawing Sheets

INFORMATION PROCESSING APPARATUS, INFORMATION PROCESSING METHOD, AND PROGRAM

TECHNICAL FIELD

Reference to Related Application

The present invention is based upon and claims the benefit of the priority of Japanese patent application No. 2011-150595, filed on Jul. 7, 2011, the disclosure of which is incorporated herein in its entirety by reference thereto. The present invention relates to an information processing apparatus, an information processing method, and a program. In particular, it relates to an information processing apparatus, an information processing method, and a program for encrypting registered data while maintaining a database function and generating keyword search indexes having resistance to information leakage.

BACKGROUND

If an index, which is data generated for a data set, is used, data including desired partial information can be extracted from a source data set. By using a document as the data and a word as the partial information, keyword search on a database can be performed.

Even when the document is encrypted in order to prevent information leakage, if the index is not encrypted, the keyword search function is not affected. However, the index includes information about the corresponding document. Thus, unless an index obtained after countermeasures against information leakage are taken is used, information leakage cannot be prevented.

Non-Patent Literatures (NPLs) 1 and 2 disclose methods for generating indexes having resistance to information leakage. The method disclosed in NPL 1 is more efficient than that disclosed in NPL 2 in calculation amount and memory capacity. Thus, hereinafter, the method disclosed in NPL 1 will be described. The methods disclosed in these literatures use a technique using Bloom filters disclosed in NPL 3. Since Bloom filters can also be used in the present invention, first, Bloom filters will be described.

"Bloom filters"

A Bloom filter is a bit string that is generated by inputting a value set. A Bloom filter can be used for efficiently determining whether an element is included in a set. Herein, processing relating to Bloom filters will be described by using two functions of a function Gen and a function Check. The function Gen receives a value set $\{w\_1, \ldots w\_n\}$ and outputs a bit string. The function Check receives a value $w\_i$ and a bit string and determines whether the value $w\_i$ is included in a set corresponding to the bit string.

The function Gen for the set $\{w\_1, \ldots, w\_n\}$ uses filter functions F, each of which receives an element $w\_i$ in the set and outputs a bit string. In addition, the function Gen outputs a logical OR of bit strings obtained by inputting the values $w\_1$ to $w\_n$ to the respective filter functions F.

FIG. 1 illustrates a Bloom filter generation method. Processing of the function Gen performed when a set $\{w\_1, w\_2, w\_3\}$ is input will be described as an example with reference to FIG. 1. As illustrated in FIG. 1, when $F(w\_1)$ is 01001001, $F(w\_2)$ is 00010010, and $F(w\_3)$ is 10000101, a Bloom filter 11011111 corresponding to the set $\{w\_1, w\_2, w\_3\}$ can be obtained by calculating a logical OR of corresponding bits of the three bit strings.

The function Check for a filter f and a set element w uses a filter function F and determines whether 1 is represented in the filter f at all the positions corresponding to the positions at which 1 is represented in F(w). If all the corresponding positions represent 1, the function Check outputs 1. Otherwise, the function Check outputs 0. Herein, the function Check outputs 1 or 0. If the element $w\_i$ is included in a document d, the function Check outputs 1. If the element $w\_i$ is not included in the document d, the function Check outputs 0.

FIG. 2 illustrates a Bloom filter determination method. An example where the Bloom filter 11011111 generated for the set $\{w\_1, w\_2, w\_3\}$ in FIG. 1 and the element $w\_2$ are input to the function Check and an example where a Bloom filter 10001101 generated for a set $\{w\_1, w\_3\}$ and the element $w\_2$ are input to the function Check will be described with reference to FIG. 2.

As illustrated in (a) of FIG. 2, if the Bloom filter is 11011111 and $F(w\_2)$ is 00010010, both the 4th bit and the 7th bit represent 1 (matched). Thus, the function Check outputs 1.

In contrast, as illustrated in (b) of FIG. 2, if the Bloom filter is 11001101 and $F(w\_2)$ is 00010010, neither the 4th bit nor the 7th bit is 1 (not matched). Thus, the function Check outputs 0.

With the function Check, it is only necessary to calculate filter values for a single word and compare the values with an input Bloom filter. Thus, this processing is more efficient than processing in which each element in a set is examined to determine whether the element is $w\_i$.

It is known that Bloom filters have the following property.
"Property 1"

The function Check could output 1 for a Bloom filter calculated for a set that does not include an input element $w\_i$. However, the function Check always outputs 1 when the element $w\_i$ is included in a set.

NPL 3 discloses a method for selecting a good filter function F with which the function Check less outputs 1 by mistake.

If "property 1" is used, by deeming a document as a word set and inputting a word set, a Bloom filter can be generated. By associating each document with a Bloom filter and storing the associated document and Bloom filter, keyword search on a document can be performd more efficiently.

By causing the function Check to determine whether a Bloom filter corresponding to each document includes a keyword, a document corresponding to a Bloom filter for which the function Check outputs 1 is extracted. In this way, there is no need to directly determine whether each document includes a keyword.

In addition, Bloom filters have the following property.
"Property 2"

By obtaining a logical OR of a Bloom filter $f\_\{S\_1\}$ generated for a set $S\_1$ and a Bloom filter $f\_\{S\_2\}$ generated for a set $S\_2$, a Bloom filter for a sum set of the set $S\_1$ and the set $S\_2$ can be obtained. Thus, by using documents as sets and words as elements, a Bloom filter obtained by a logical OR is a Bloom filter for a document that can be represented by a sum set of words included in both of the documents.

"Property 2" is attributable to use of the same filter function F for different documents. Hereinafter, a logical OR of Bloom filters for a document $D\_1$ and a document $D\_2$ will be described as a Bloom filter for the documents $D\_1$ and $D\_2$. If subscripts for documents $D\_1$ to $D\_4$ are consecutive, a logical OR of Bloom filters for these documents will be described as a Bloom filter for documents $D\_1, \ldots D\_4$.

Next, a logical OR operation will be described based on a simple example. A logical OR operation is performed as follows.

Bloom filter A: 010001
Bloom filter B: 010100
A∘B: 010101

In the following, an operation of obtaining a logical OR of the Bloom filter $f\_\{S\_1\}$ and the Bloom filter $f\_\{S\_2\}$ will be represented as $f\_\{S\_1\} \circ f\_\{S\_2\}$.

NPL 1:
Eu-Jin Goh, "Secure Indexes," May 5, 2004 [online], [searched on Jun. 21, 2011], Internet <URL:http://crypto.stanford.edu/ eujin/papers/secureindex/secureindex.pdf>

NPL 2:
Y.-C.Chang and M.Mitzenmacher, "Privacy Preserving Keyword Searches on Remote Encrypted Data," Cryptology ePrint Archive, Report 2004/051, February 2004. [online], [searched on Jun. 21, 2011], Internet <URL:http://eprinti-acr.org/2004/051.pdf>

NPL 3:
B.Bloom, "Space/Time Trade-offs in Hash Coding with Allowable Errors," Communications of the ACM, vol.13, No.7, pp.422-426, July 1970.

SUMMARY

The following analysis has been made by the present inventors.

According to the above keyword search method, the function Check needs to be performed on all Bloom filters. By using "property 2," keyword search for a word that is not included in many documents can be performed more efficiently.

In this efficient method, first, after a Bloom filter is generated for each document, a Bloom filter for assisting search is generated. More specifically, processing Conc that receives a plurality of Bloom filters and that outputs a plurality of Bloom filters is used. The processing Conc receives a plurality of Bloom filters $F\_1, \ldots, F\_n$. Characters $1, \ldots, n$ inside $\_\{ \}$ of a Bloom filter are used as identification information allocated to the Bloom filter. For example, the identification information may be a file name of the corresponding document. A set tmp is used during the processing Conc.

Processing Conc:
1. A set tmp is set as an empty set ($\phi$).
2. Bloom filters $F\_1$ to $F\_n$ are input.
3. The Bloom filters $F\_1$ to $F\_n$ are added to the set tmp.
4. Two elements $F\_i$ and $F\_j$ are selected from the set tmp.
5. A logical OR $F\_i \circ F\_j$ is calculated and added to the set tmp.
6. The elements $F\_i$ and $F\_j$ are removed from the set tmp.
7. $(F\_i, (i, j))$ and $(F\_j, (i, j))$ are output.
8. $F\_\{i, j\}$ is added to the set tmp.
9. If the number of elements included in the set tmp is 1, identification information representing the element and a root node is output as a pair and the processing is ended. Otherwise, the operation returns to the above step 4.

A Bloom filter generated by the above processing can be associated in a tree structure in which the input Bloom filters are leaf nodes, a logical OR of leaf nodes is an intermediate node, and a logical OR of all the filters is the root node. In addition, the Bloom filter of an intermediate node is output with the identification information about the parent node of the intermediate node. Thus, from the identification information about a parent node, a filter corresponding to a child node of the parent node can easily be selected. Each Bloom filter is associated with the identification information about a corresponding parent so that the associated information can be used when search processing is performed from the root node later. However, as long as a leaf node can be tracked from the root node, any other method may be used.

FIG. 3 illustrates a tree structure of filters output when eight Bloom filters $F\_\{1\}, \ldots, F\_\{8\}$ are input to the processing Conc. FIG. 3 illustrates a binary tree structure as an example.

According to "property 2," each Bloom filter $F\_\{i, \ldots\}$ generated by the above method is a Bloom filter for a document having a sum set of words included in the documents described in $\{ \}$ as a word set.

First, search processing on a target word is performed based on breadth-first search from the filter corresponding to the root node. If 0 is output, it is determined that the target word is not included in any document. If 1 is output, search processing is performed on a child node of the root node. By performing search processing sequentially until a leaf node is examined, a document(s) including the target word can be determined.

Next, processing TS that performs this search processing will be described. A plurality of Bloom filters generated by using the processing Cone on documents and a keyword w are input to the processing TS.

Processing TS:
1. $(F\_\{i, \ldots, j\}, (*))$ paired with identification information $*$ representing a root node is selected from the input Bloom filters and $(F\_\{i, \ldots, j\}, (*))$ is inserted to a set tmp 1.
2. If the set tmp 1 is not an empty set, one Bloom filter $F\_\{i, \ldots\}$ is selected from the set tmp 1. Otherwise, the processing is ended.
3. If $\text{Check}(F\_\{i, \ldots\}, w)=1$, $(F\_\{i, j\}, (*))$ is removed from the set tmp 1, and all Bloom filters having $\{i, \ldots\}$ as parent node identification information are inserted to a set tmp 2. If $F\_\{i, \ldots\}$ is a Bloom filter for a single document, $\{i, \ldots\}$ is output. If $\text{Check}(F\_\{i, \ldots\}, w)=0$, $(F\_\{i, j\}, (*))$ is removed from the set tmp 1.
4. If the set tmp 1 is not an empty set, the operation returns to the above step 2. However, if the set tmp 1 is an empty set, all the elements in the set tmp 2 are moved to the set tmp 1 and the operation returns to step 2.

If many documents are registered and the number of documents including a search target keyword is small, keyword search using this method can be performed efficiently. FIG. 3 illustrates a binary tree structure. However, a different design of the processing Conc may result in a structure other than the binary tree structure. If the number of registered documents is n, the processing Conc generating filters in a binary tree structure is used, and the number of documents including a search target keyword is x, it is only necessary to check $2*x*(\log\_2 n)$ filters at most, counted as an advantageous effect. Herein, a binary tree structure is used for ease of description.

According to the above method, search processing can be performed more efficiently. However, deletion of a document and updating of a document are not considered in this method, counted as a problem.

For example, if a Bloom filter $F\_1$ generated for a document $D\_1$ is 10110 and a Bloom filter $F\_\{2, \ldots\}$ generated for a document $D\_\{2, \ldots\}$ is 01110, a Bloom filter $F\_\{1, 2, \ldots\}$ for a document $D\_\{1, 2, \ldots\}$ is 11110. In this case, even if the information relating to $F\_\{1\}$ is deleted from $F\_\{1, 2, \ldots\}$, the Bloom filter relating to $F\_\{2, \ldots\}$ cannot be obtained, since only $F\_\{1, 2, \ldots\}$ and $F\_\{1\}$ are insufficient. More specifically, while both $F\_\{1, 2\}$ and $F\_\{1\}$ represent 1 at the 1st, 3rd, and 4th bits, whether $F\_\{2, \ldots\}$ represents 0 or 1 at the same bits cannot be determined.

This problem can be solved by using the following property of Bloom filters.

"Property 3"

The following description will be made, assuming that the bits of a Bloom filter are treated as a value string and that a string C is obtained by adding the elements in the strings of Bloom filters $F\_\{S\_1\}$ and $F\_\{S\_2\}$ generated for sets $S\_1$ and $S\_2$, respectively. Assuming that 0 is allocated to each element representing 0 in the string C and 1 is allocated to each element representing 1 or more, the string C can be considered as a Bloom filter generated for a sum set of the sets $S\_1$ and $S\_2$. In addition, assuming that 0 is allocated to each element representing 0 in the string and 1 is allocated to each element representing 1 or more, a string obtained by subtracting the elements in the string of $F\_\{S\_1\}$ from the respective elements in the string C can be considered as the Bloom filter for set $S\_2$.

Hereinafter, such subtraction between strings will be represented as $f\_\{S\_1\}-f\_\{S\_2\}$.

Next, addition and subtraction between strings will be described based on simple examples. Addition and subtraction between strings are performed as follows.

String A: 020101
String B: 010100
String C = String A + String B: 030201
String C − String B: 020101

When a plurality of strings are added together, an upper limit may be set to the value of each string element, to suppress an increase in memory capacity. When an upper limit is set, even if a value is added to the upper limit, the upper limit is not changed. If a value is subtracted from the upper limit, the upper limit is not changed, either. It is known that, in this way, "property 3" is not lost from a calculated string. In NPL 1 and the present invention, as long as processing is performed normally, processing for performing further calculation on 0 is not performed.

In the present invention, an upper limit that is set to each string element used when addition of Bloom filters or strings are performed will not be particularly described. However, an upper limit used when addition is performed may be set. If an upper limit is set, addition is performed in accordance with the above method.

Next, a method that enables deleting and updating of a registered document while achieving efficient search with "property 3" will be described.

First, as an initial step, generation of information for assisting search on a plurality of registered documents will be described.

In this method, too, first, Bloom filters are generated for the respective documents, and next, strings for assisting search are generated. More specifically, an algorithm receiving a plurality of Bloom filters and outputting a plurality of strings is used. However, since it is only necessary to replace ○ processing in step 5 of the above processing Conc by + processing, detailed description will be omitted.

FIG. 4 illustrates a tree structure of strings output when eight Bloom filters $F\_\{1\}, \ldots, F\_\{8\}$ are input to processing Conc 2. FIG. 4 illustrates a binary tree structure, as is the case with the processing Conc (FIG. 3).

Search processing can also be performed based on the above processing TS. When the function Check is performed, if a string is input, it is only necessary to add processing the string as a Bloom filter to the above method. Thus, detailed description will be omitted.

Next, a method for deleting a document from a data string created as described above will be described. FIG. 5 illustrates a method for deleting information about $F\_\{8\}$ from the data string created in FIG. 4.

Based on "property 3," it is only necessary to subtract $F\_\{8\}$ from each of the data strings having $F\_\{8\}$ as a child. Namely, $F\_\{8\}$ is subtracted from each of $F\_\{7, 8\},\{5, \ldots, 8\}$, $F\_\{5, \ldots, 8\}$, $\{1, \ldots, 8\}$, and $F\_\{1, \ldots, 8\},\{*\}$. Consequently, if each bit string is considered as a Bloom filter, information about $F\_\{8\}$ is not included. Since the left side of the tree structure is not involved, the left side of the tree structure is not illustrated in FIG. 5. In this case, the values of the Bloom filters other than those of $F\_\{8\}$ are not necessary. Thus, deletion of a document can be performed easily.

Generally, when deleting information about $F\_\{i\}$, it is only necessary to subtract $F\_\{i\}$ from each of the bit strings having i in $\{, \ldots, \}$.

Next, a method for updating a document will be described. Updating of a document can be realized by deleting a document and adding a document. In this method, information about $F\_\{8\}$ is deleted from data strings as illustrated in FIG. 5 and another $F\_\{8\}$ is added to the data strings as illustrated FIG. 6. As illustrated in FIG. 6, based on "property 3," it is only necessary to add a new $F\_\{8\}$ to each of the data strings having $F\_\{8\}$ as a child.

Generally, to add information about $F\_\{i\}$, it is only necessary to add $F\_\{i\}$ to each of the bit strings having i in $\{, \ldots,\}$.

In the above method, intermediate nodes are considered as data strings, not as bit strings. Thus, according to the above method, as compared with a case where search is made more efficient by using "property 2," the memory capacity required for data assisting search is increased. However, deletion and updating of a document can be performed more easily, counted as an advantageous effect.

Bloom filters are useful in keyword search. However, in terms of prevention of information leakage, Bloom filters have the following two problems.

"First Problem with Bloom Filters"

Only words are input to filter functions of Bloom filters. Thus, when documents are different, if the same word is included, the same feature appears through Bloom filters. Thus, since similarity between Bloom filters relates to similarity between the original documents, information may be leaked from the similarity between Bloom filters.

"Second Problem with Bloom Filters"

Search processing is performed by receiving a word and a Bloom filter. Namely, if information about a Bloom filter is available, anybody can perform search processing. Thus, even if a document corresponding to a filter is encrypted and stored, a lot of information can be extracted from the filter.

NPLs 1 and 2 disclose methods for solving these problems. Since the methods disclosed in NPL 1 are superior to those disclosed in NPL 2 in efficiency and security, two methods disclosed in NPL 1 will hereinafter be described.

"First method"

In the first method, a document is treated as a combination of a word set and identification information. Information such as file names or serial numbers for distinguishing documents may be used as the identification information. A document D including identification information z and words $w\_1, \ldots, w\_n$ will hereinafter be represented as $(\{w\_1, \ldots, w\_n\}, z)$.

In the first method, secret information (hereinafter referred to as a "key K") only known by an agent generating filters is used. The key K is used for converting each word $w\_i$ included in the document to a value called a trapdoor. This conversion processing can be realized by trapdoor generation functions Tr that receive the key and the respective words. When the key K and a word w are input to a trapdoor generation function Tr, a trapdoor for the word w is output. Hereinafter, processing for causing a trapdoor generation function Tr to generate a trapdoor for a word will be referred to as trapdoor generation processing.

In addition, in the first method, a different filter function is used for each document. Each filter function receives identification information z and a trapdoor and outputs a bit string. In addition, each function will be referred to as an identification-information-dependant filter function F'.

In the first method, a function for generating a filter will be referred to as Gen 2. The function Gen 2 can be represented as follows.

Function Gen 2:
1. A document ($\{w\_1, \ldots, w\_n\}$, z) and a key K are input.
2. Trapdoors $x\_1 = Tr(K, w\_1), \ldots, x\_n = Tr(K, w\_n)$ are calculated.
3. Bit strings $y\_1 = F'(z, x\_1), \ldots, y\_n = F'(z, x\_n)$ are calculated.
4. A logical OR of the bit strings $y\_1$ to $y\_n$ is obtained and output.

A filter generated by the above processing will be referred to as a secure index. Processing for generating a secure index will be referred to as "secure index generation processing."

FIG. 7 illustrates a secure index generation method according to the first method. FIG. 7 illustrates processing performed when the document ($\{w\_1, w\_2, w\_3\}$, z) and the key K are input to the function Gen 2.

Next, processing for determining whether a filter f corresponding to the identification information z includes a word w will be described. As described above, with Bloom filters, the function Check receiving a word and a filter is used. In contrast, in the first method, a function Check 2 receiving a trapdoor x, a filter f, and identification information z is used. The function Check 2 can be represented as follows.

Function Check 2:
1. A filter f, identification information z, and a trapdoor x are input.
2. A bit string $y = F'(z, x)$ is calculated.
3. Whether 1 is represented in the filter f at all the positions corresponding to the positions at which 1 is represented in the bit string y. If all the corresponding positions represent 1, the function Check 2 outputs 1. Otherwise, the function Check 2 outputs 0.

The above processing is referred to as "secure index determination processing." FIG. 8 illustrates a secure index determination method according to the first method. FIG. 8 illustrates an operation of the function Check 2. A trapdoor is calculated by using a word and the key K. Thus, when a user searches for a certain word, if the user does not have the key K, a trapdoor corresponding to that word cannot be calculated. Namely, the function Check 2 cannot be used.

Thus, only an agent having the key K can calculate the trapdoor and request a database or the like storing documents and filters to perform search processing. With a Bloom filter, a user can search a database for any word. However, with a filter generated by the first method, a user can search for only values whose trapdoors are known by the user. When the filter input to the function Check 2 is a data string, not a bit string, 0 is allocated to each string element representing 0 and 1 is allocated to each string element representing a value other than 0. Under this condition, processing described in the function Check 2 is performed. The above method solves the "second problem with Bloom filters."

In addition, the "first problem with Bloom filters" is attributable to use of the same filter function for all documents. However, with the function Gen 2, if an identification-information-dependant filter function F' receives different identification information, the identification-information-dependant filter function F' outputs a different output. Thus, the "first problem with Bloom filters" is solved.

The first method is different from the methods using Bloom filters in that words are converted into trapdoors. However, the first method is the same as the methods using Bloom filters in that a bit string is calculated for each word and a logical OR of bit strings is obtained. Thus, with the first method, "property 1" of Bloom filters is present. Namely, while the first method is different from the methods using Bloom filters in that trapdoors are used, by applying the function Check 2 to all filters, keyword search can be performed in the same way as that using Bloom filters.

In addition, with the first method, a different filter function is used per document. Thus, even if a logical OR of two filters generated for two documents is calculated, a filter for a document made by a sum set of the words included in the two documents cannot be obtained. Thus, with the first method, "property 2" of Bloom filters is not present. For the same reason, with the first method, "property 3" of Bloom filters is not present. Thus, unlike the methods using Bloom filters, the first method has a problem in that the technique for making search processing more efficient and the technique for facilitating deletion and updating of a document cannot be applied.

NPL 1 discloses a method for solving this problem. Hereinafter, the method disclosed in NPL 1 will be described as a second method.

"Second method"

The second method treats a document as a word set. In the second method, too, the secret information (namely, the key K) known only by an agent generating filters and the trapdoor generation functions Tr are used as in the first method. However, in the second method, as is the case with the methods using Bloom filters, a filter function F common to all documents is used.

In the second method, a function Gen 3 is used as a function for generating a filter. The function Gen 3 can be represented as follows.

Function Gen 3:
1. A document $\{w\_1, w\_n\}$ and a key K are input.
2. Trapdoors $x\_1 = Tr(K, w\_1), x\_n = Tr(K, w\_n)$ are calculated.
3. Bit strings $y\_1 = F(x\_1), y\_n = F(x\_n)$ are calculated
4. A logical OR of the bit strings $y\_1$ to $y\_n$ is obtained and output.

FIG. 9 illustrates a secure index generation method according to the second method. FIG. 9 illustrates processing performed when a document $\{w\_1, w\_2, w\_3\}$ and the key K are input to the function Gen 3.

Next, processing for determining whether a certain filter y includes a word w will be described. In the second method, a function Check 3 that receives a trapdoor and a filter is used. The function Check 3 can be represented as follows.

Function Check 3:
1. A filter f and a trapdoor x are input.
2. A bit string $y = F(x)$ is calculated.
3. Whether 1 is represented in the filter f at all the positions corresponding to the positions at which 1 is represented in the bit string y. If all the corresponding positions represent 1, the function Check 3 outputs 1. Otherwise, the function Check 3 outputs 0.

FIG. 10 illustrates an operation of the function Check 3. According to the second method, the "second problem with Bloom filters" is solved, for the same reason as that with the first method.

In addition, with the second method, the same filter function F is used for all documents. Thus, with the second method, "property 2" and "property 3" of Bloom filters are present. By using these properties, with the second method, as is the case with the methods using Bloom filters, the technique for making search processing more efficient and the technique for facilitating deletion and updating of a document can be applied.

However, since the same filter function F is used for all documents in the second method, the "first problem with Bloom filters" arises.

Thus, the first method provides high resistance to information leakage. However, with the first method, it is necessary to determine an index corresponding to all documents even when a word with a low appearance rate is searched for. Namely, search processing takes time, counted as a problem. However, according to the second method, search can be performed efficiently, and a document can be deleted and updated easily. However, the second method provides low resistance to information leakage, counted as a problem.

Thus, there is a need in the art to generate a keyword search index having resistance to information leakage.

According to a first aspect of the present invention, there is provided an information processing apparatus, comprising: a storage unit that stores a tree structure formed by nodes, each of which stores identification information identifying a document; and a registration unit that registers documents in the storage unit. The registration unit comprises: a reception unit that receives a document including identification information identifying the document and a word set and a key; an identification information registration unit that registers received identification information in a leaf node in the tree structure; a secure index generation unit that calculates a secure index corresponding to identification information registered in each node from a root node to the leaf node in the tree structure based on the word set and the key and generates a value calculated by adding the calculated secure index as a search index for the document; and an index registration unit that stores a value calculated by adding a search index generated for each of a plurality of received documents in the storage unit as a search index for the plurality of documents.

According to a second aspect of the present invention, there is provided an information processing method, comprising: receiving a document including identification information identifying the document and a word set and a key; registering received identification information in a leaf node in a tree structure formed by nodes, each of which stores identification information identifying a document; calculating a secure index corresponding to identification information registered in each node from a root node to the leaf node in the tree structure based on the word set and the key and generating a value calculated by adding the calculated secure index as a search index for the document; and storing a value calculated by adding a search index generated for each of a plurality of received documents in a storage unit as a search index for the plurality of documents.

According to a third aspect of the present invention, there is provided a program, causing a computer to execute: receiving a document including identification information identifying the document and a word set and a key; registering received identification information in a leaf node in a tree structure formed by nodes, each of which is stores identification information identifying a document; calculating a secure index corresponding to identification information registered in each node from a root node to the leaf node in the tree structure based on the word set and the key and generating a value calculated by adding the calculated secure index as a search index for the document; and storing a value calculated by adding a search index generated for each of a plurality of received documents in a storage unit as a search index for the plurality of documents.

This program may be stored in a non-transient computer-readable storage medium.

The present invention provides the following advantage, but not restricted thereto. The information processing apparatus, the information processing method, and the program according to the present invention can generate a keyword search index having resistance to information leakage.

PREFERRED MODES

Figure 1:
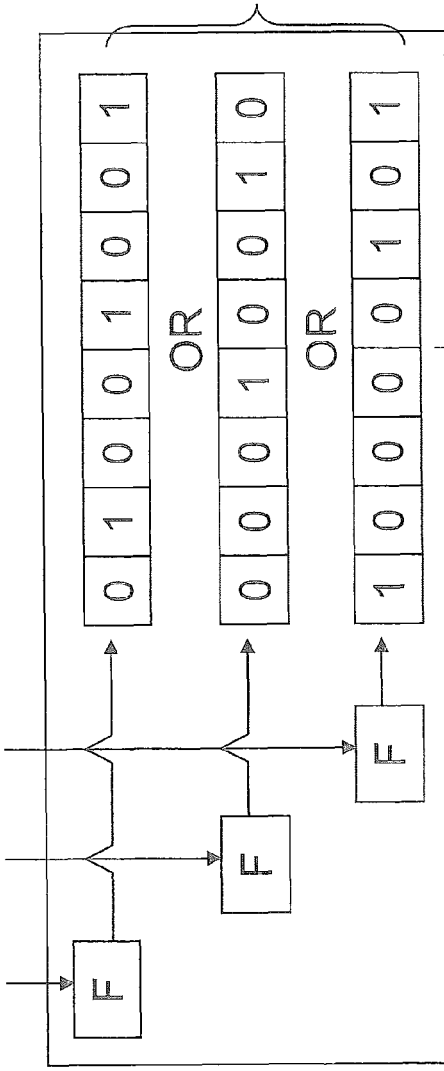
FIG. 1 illustrates a Bloom filter generation method.
Figure 2:
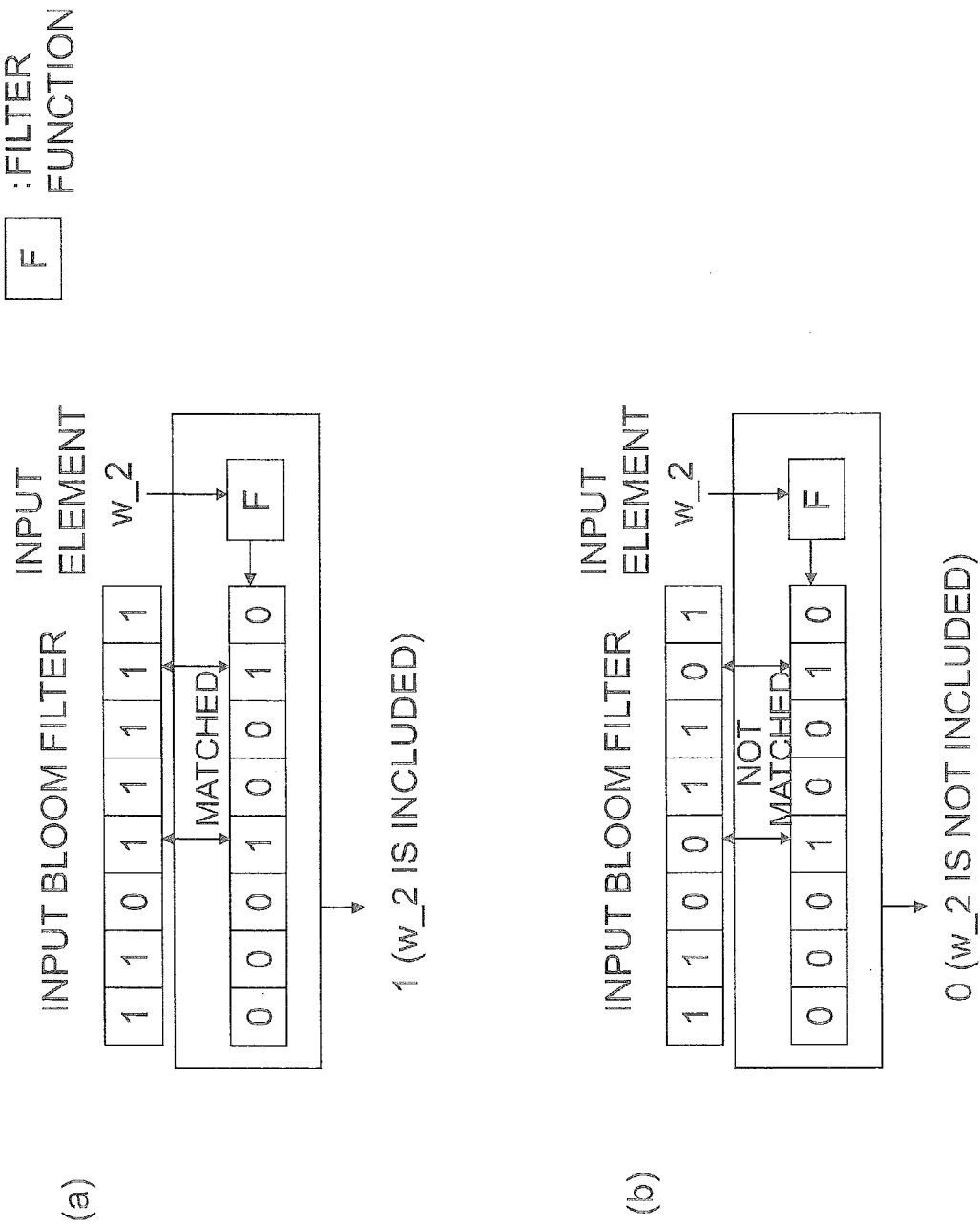
FIG. 2 illustrates a Bloom filter determination method.
Figure 3:
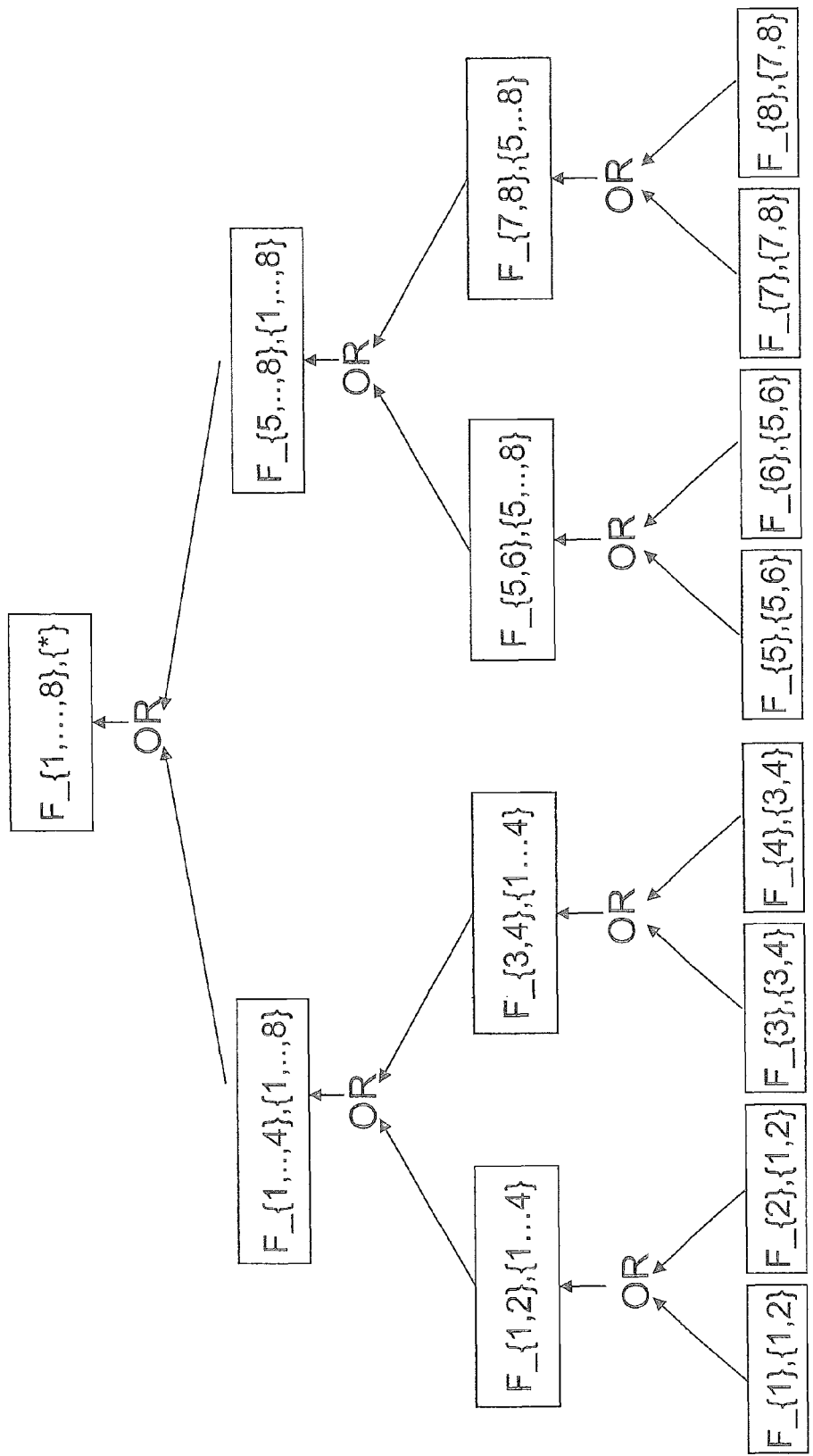
FIG. 3 illustrates management of a tree structure of Bloom filters (part 1).
Figure 4:
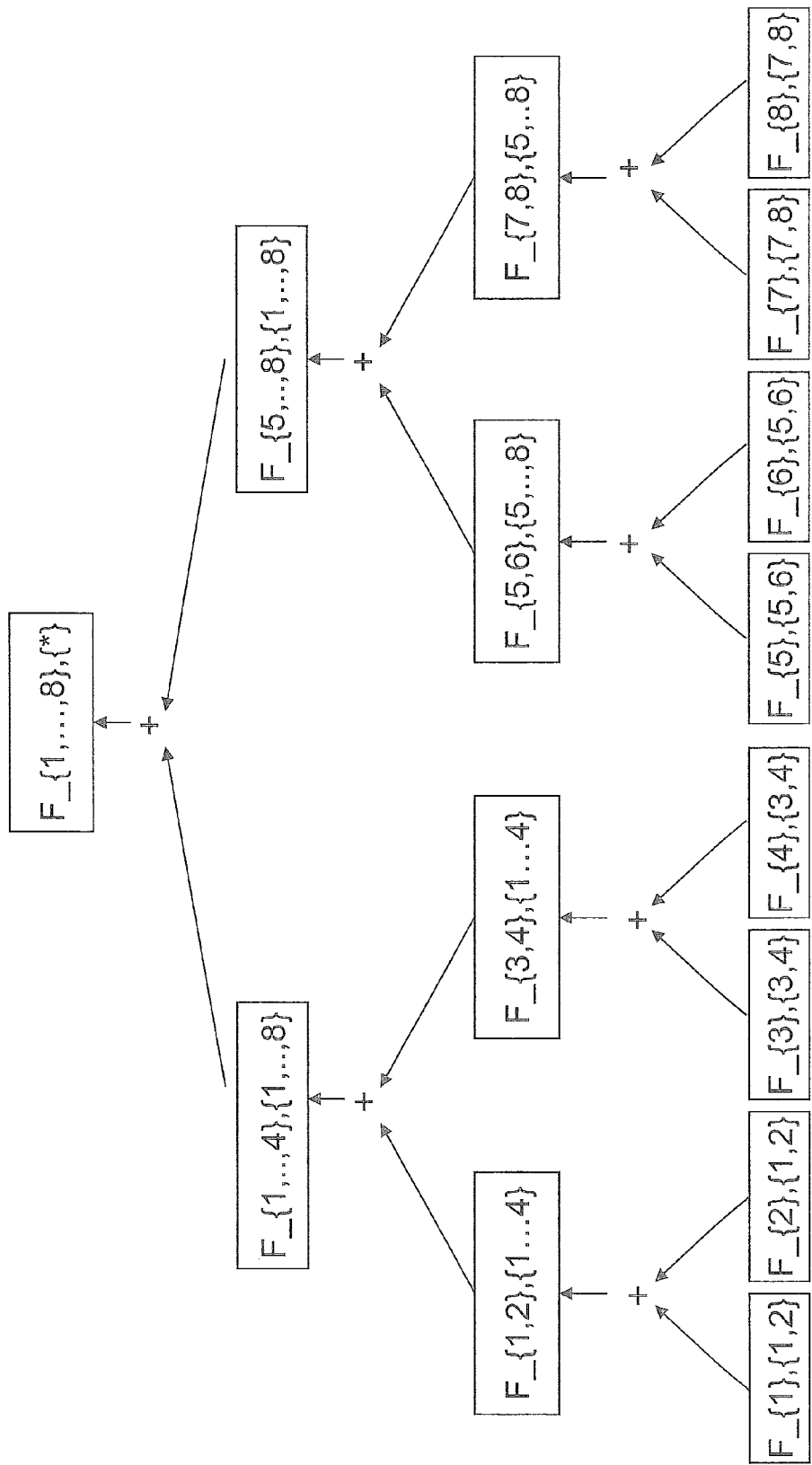
FIG. 4 illustrates management of a tree structure of Bloom filters (part 2).
Figure 5:
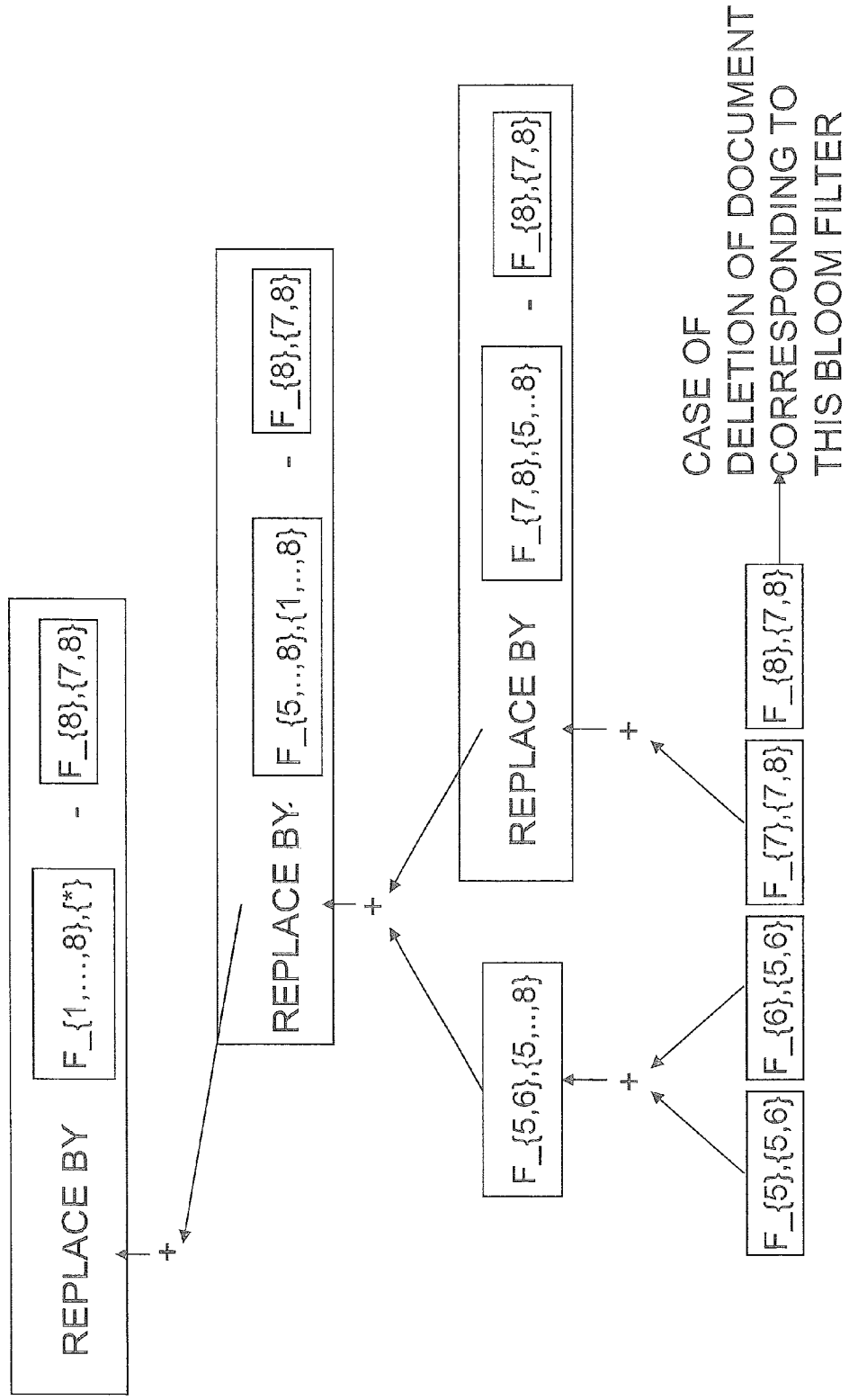
FIG. 5 illustrates a document deletion method based on the Bloom filters managed by using a tree structure.
Figure 6:
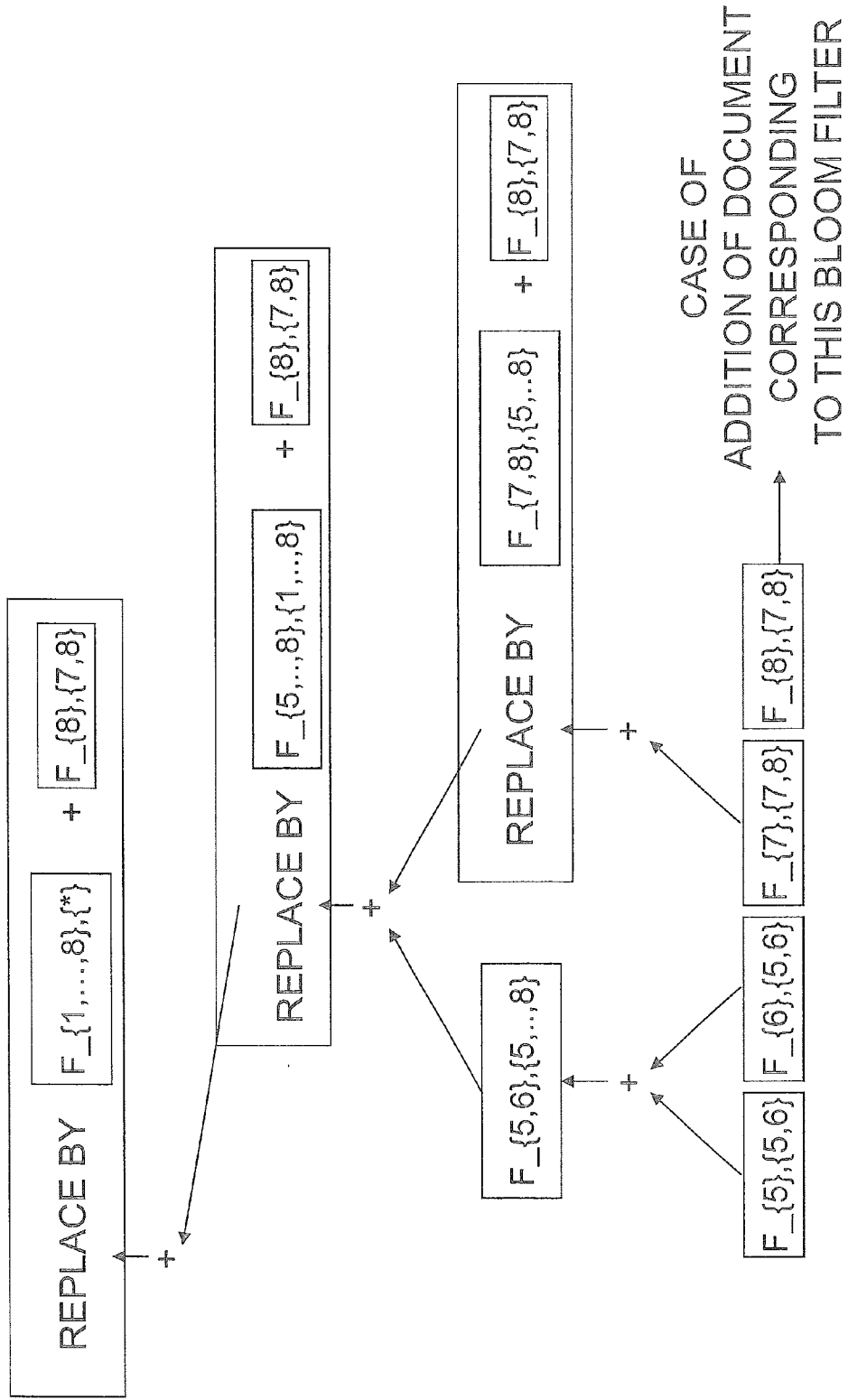
FIG. 6 illustrates a document addition method based on the Bloom filters managed by using a tree structure.
Figure 7:
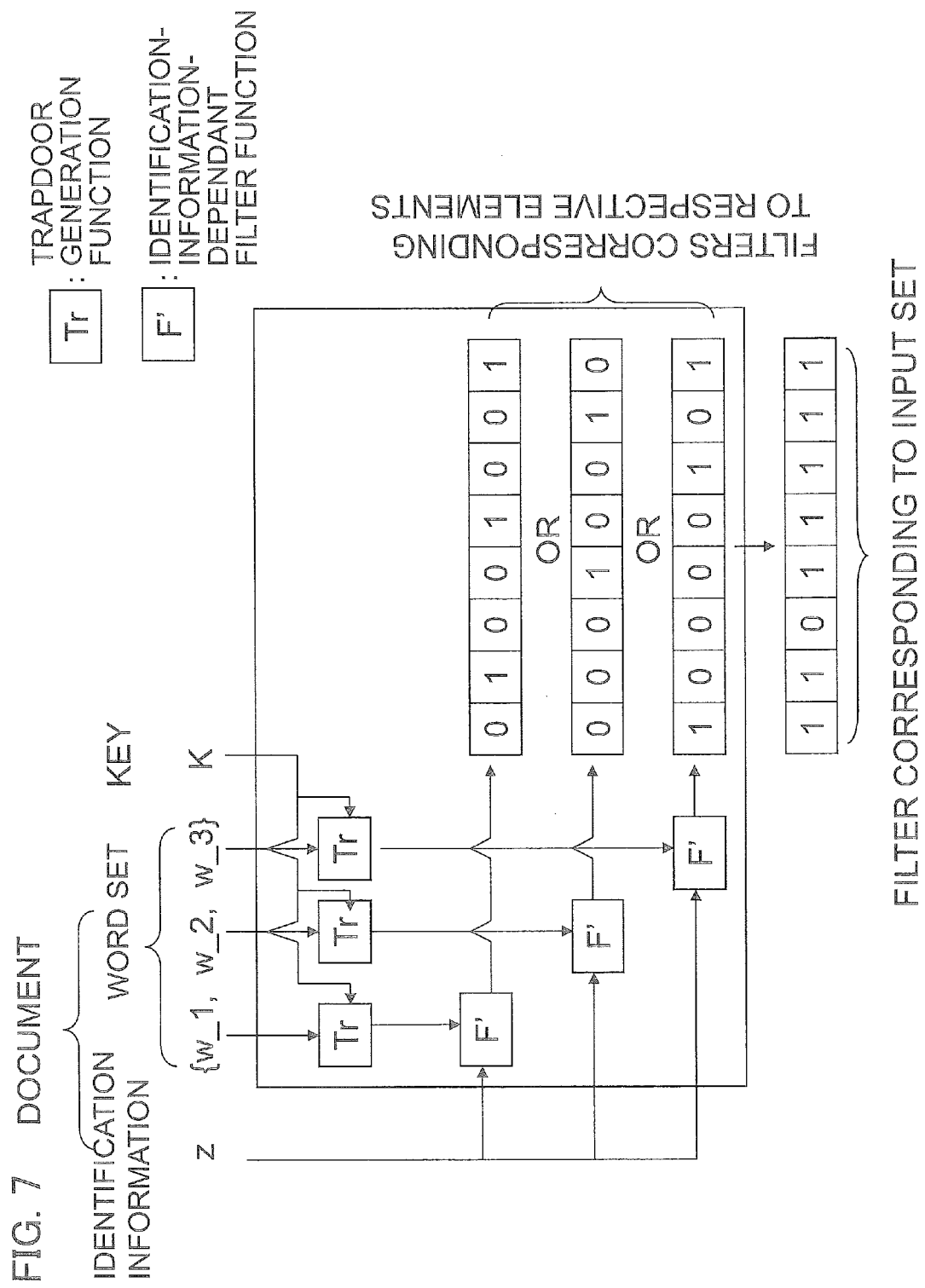
FIG. 7 illustrates a secure index generation method based on a first method disclosed in NPL 1.
Figure 8:
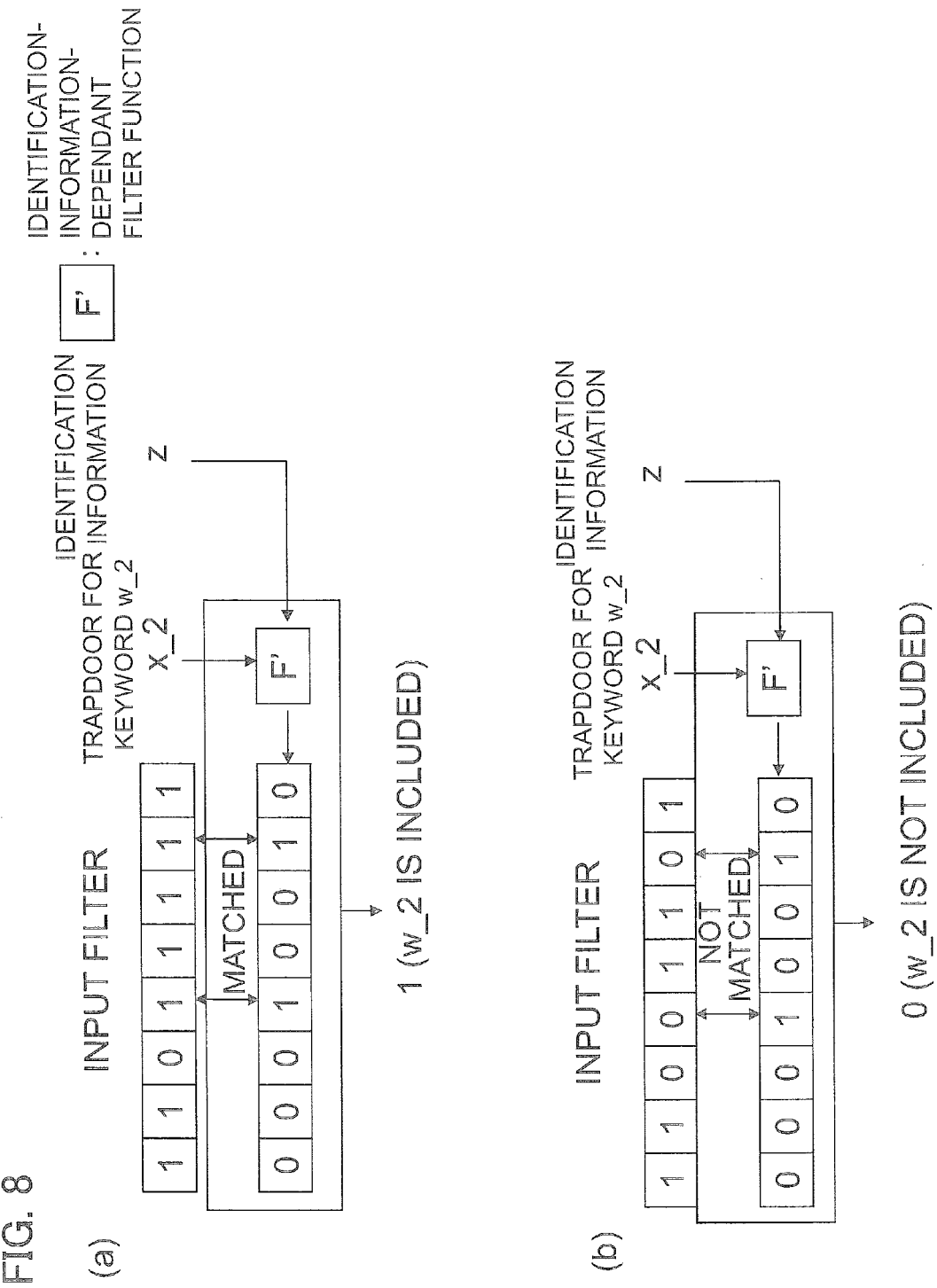
FIG. 8 illustrates a secure index determination method based on the first method disclosed in NPL 1.
Figure 9:
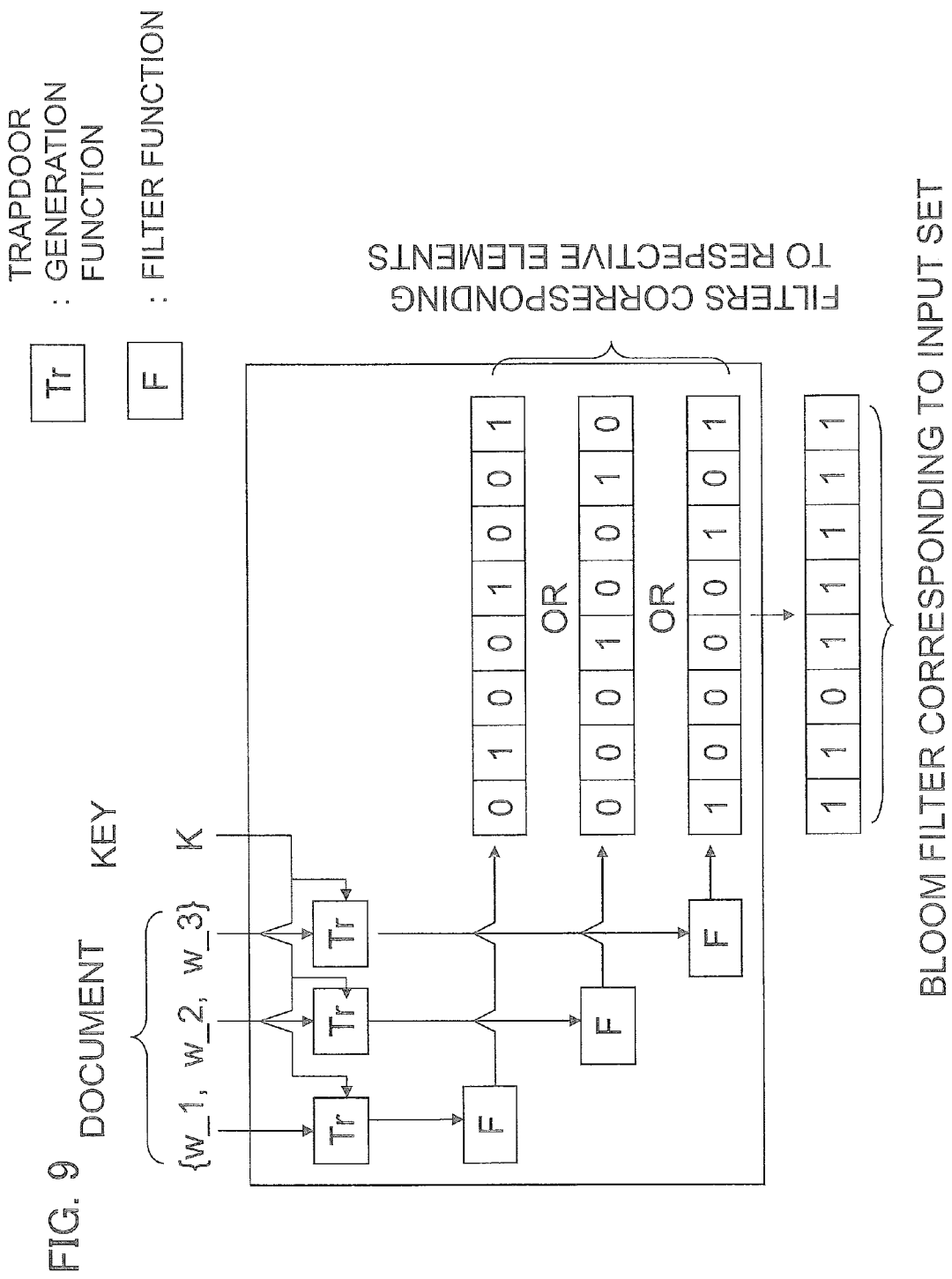
FIG. 9 illustrates a secure index generation method based on a second method disclosed in NPL 1.
Figure 10:
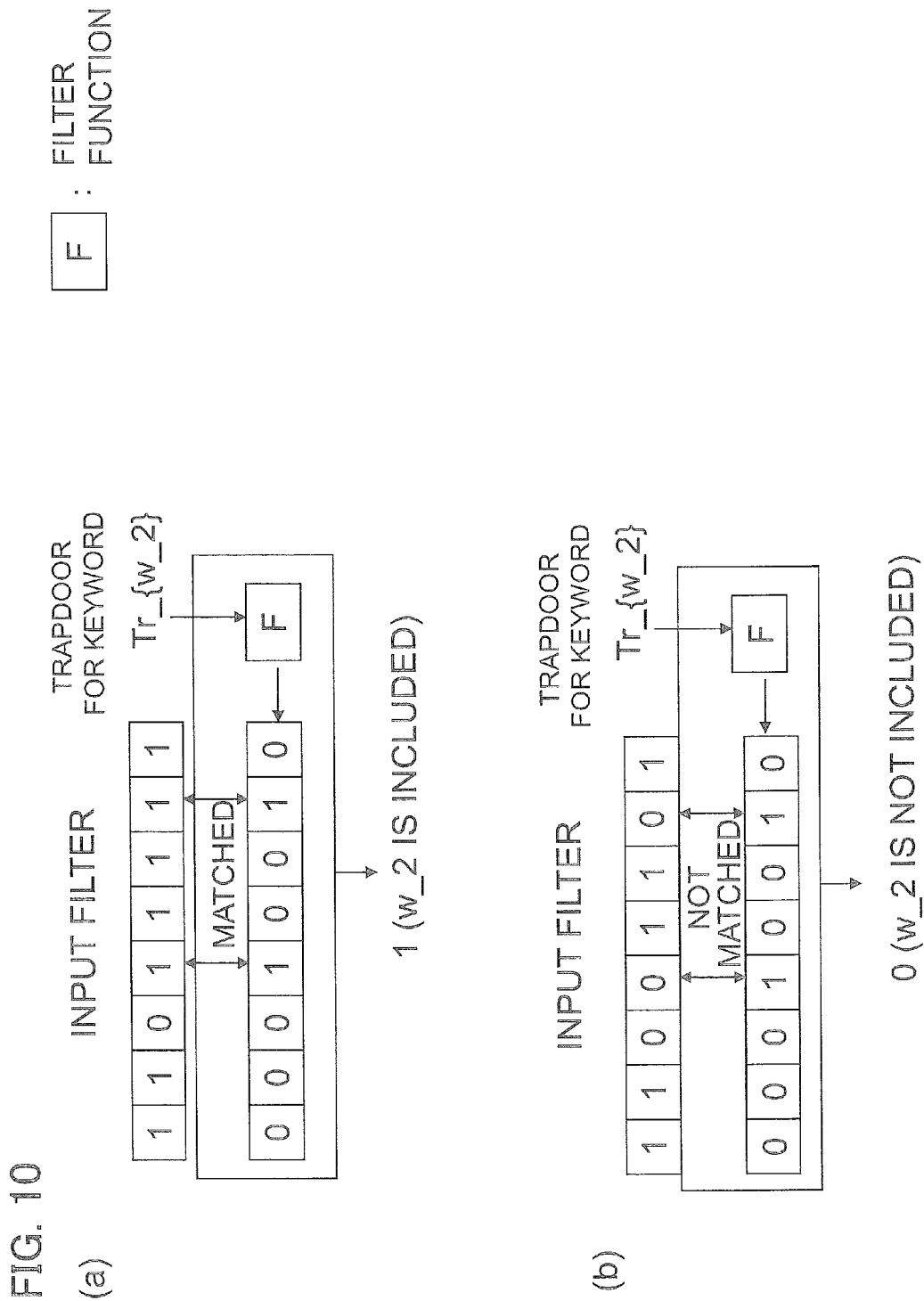
FIG. 10 illustrates a secure index determination method based on the second method disclosed in NPL 1.

In the present disclosure, there are various possible modes, which include the following but not restricted thereto. First, an outline of the present invention will be described. However, the reference characters in the following outline are merely used as examples to facilitate understanding of the present invention. Therefore, the reference characters are not intended to limit the present invention to the illustrated modes.

With an information processing apparatus according to the present invention, identification information about a document is associated with a leaf node in a tree structure and information about each of the nodes from a root node to a leaf node in a tree structure is used as identification information, so as to generate a secure index. A document index is obtained by adding such secure index. If indexes are generated for a plurality of documents, a value obtained by adding the indexes is stored. In addition, with the information processing apparatus according to the present invention, a value generated in relation to each document is encrypted and managed as deletion information. While the above description has been made based on the methods disclosed in NPL 1, an arbitrary index generation method may be used, as long as the method has like properties.

Figure 11:
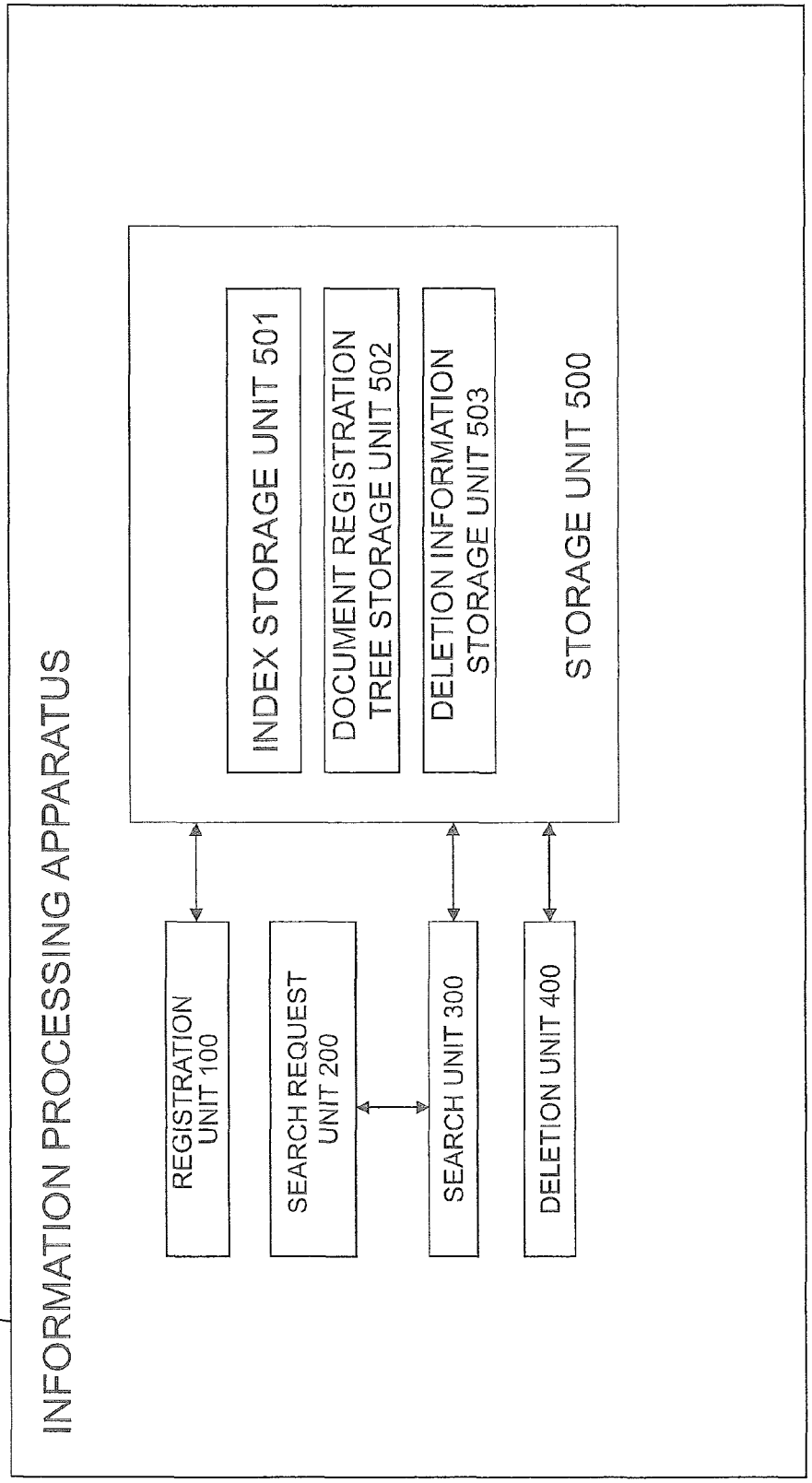
FIG. 11 is a block diagram illustrating a configuration of an information processing apparatus according to a first exemplary embodiment.
Figure 12:
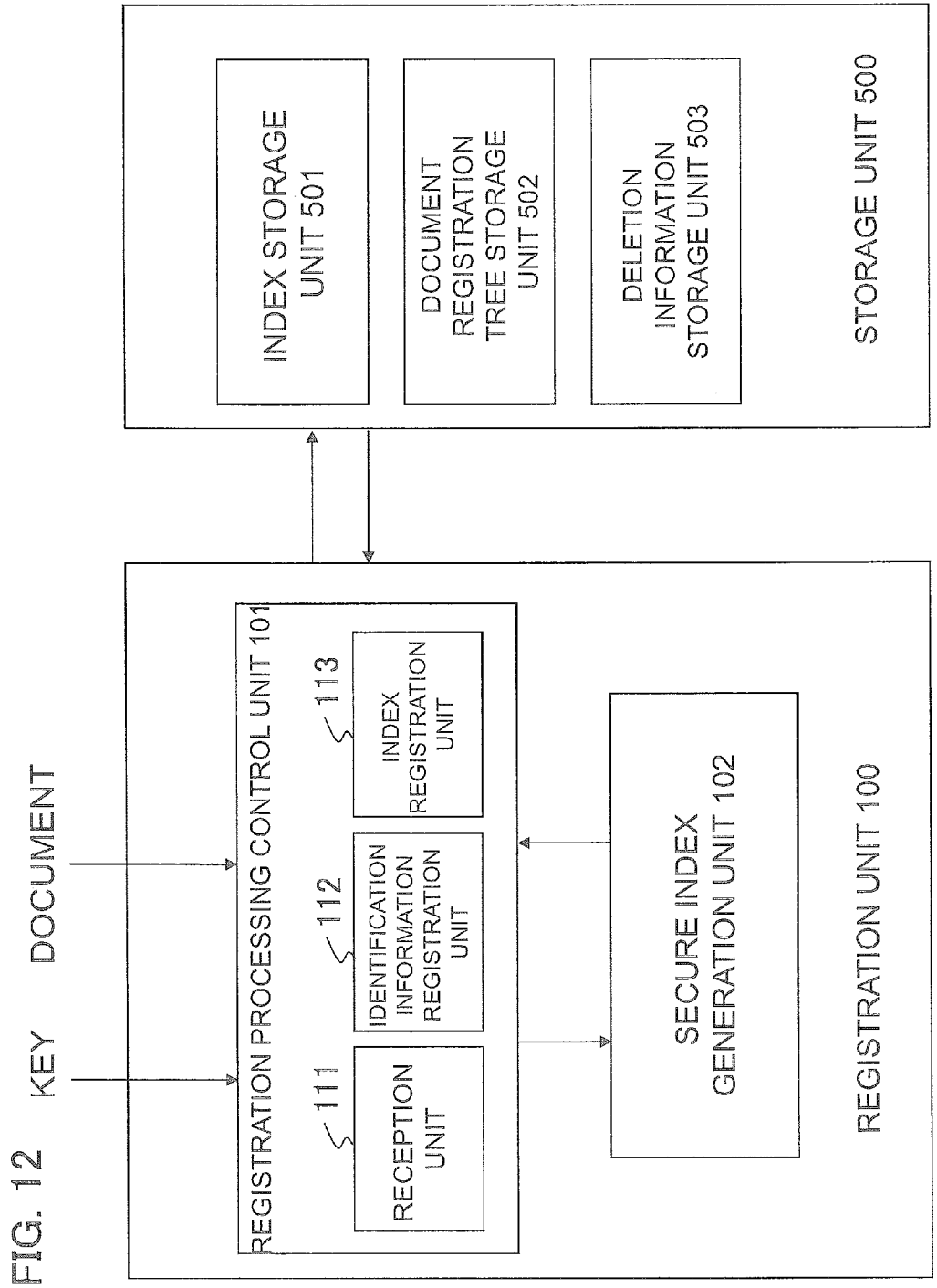
FIG. 12 is a block diagram illustrating a configuration of a registration unit in the information processing apparatus according to the first exemplary embodiment.

As illustrated in FIGS. 11 and 12, an information processing apparatus (50) according to the present invention comprises: a storage unit (500) that stores a tree structure formed by nodes, each of which stores identification information identifying a document; and a registration unit (100) that registers documents in the storage unit (500). The registration unit (100) comprises: a reception unit (111) that receives a document including identification information identifying the document and a word set and a key; an identification information registration unit (112) that registers received identification information in a leaf node in the tree structure; a secure index generation unit (102) that calculates a secure index corresponding to identification information registered in each node from a root node to the leaf node in the tree structure based on the word set and the key and generates a value calculated by adding the calculated secure index as a search index for the document; and an index registration unit (113) that stores a value calculated by adding a search index generated for each of a plurality of received documents in the storage unit (501) as a search index for the plurality of documents.

In addition, the index registration unit (113) may store information obtained by associating an encrypted text obtained by encrypting a search index generated for each of the plurality of documents with identification information about the document in the storage unit (500) as deletion information for deleting the document.

In addition, the information processing apparatus (50) may further comprise: a search request unit (200) that receives a word and a key and generates a trapdoor for the word by using the key; and a search unit (300) that receives the trapdoor, reading a search index for the plurality of documents and the tree structure from the storage unit (500), selecting a node closest to a root node among nodes to which a flag has not been allocated from the tree structure, and performing secure index determination based on identification information registered in the selected node, the trapdoor, and the search index. The search unit (300) may repeat, until a flag is allocated to all the nodes included in the tree structure, processing for allocating a first flag to the node if the search unit (300) determines that the word is included in a document identified by the identification information, and otherwise, allocating a second flag to the node and descendant node(s) of the node. The search unit (300) output identification information registered in a node to which the first flag is allocated among the nodes included in the tree structure.

In addition, the information processing apparatus (50) may further comprise a deletion unit (400) that receives identification information for identifying a document that needs to be deleted and decoding information for cancelling the encryption, deletes the identification information from the tree structure, decodes encrypted text associated with the identification information in the deletion information by using the decoding information, obtains a search index generated for the document, and subtracts the obtained search index from a search index for the plurality of documents.

The information processing apparatus (50) may be configured so that a first document is updated to a second document by causing the deletion unit (400) to delete the first document and causing the registration unit (100) to register the second document.

With the information processing apparatus according to the present invention, since a secure index obtained by using each of the nodes from a root node to a leaf node in a document registration tree in relation to each document as identification information is added to an index, keyword search for a word included in documents can be processed accurately. Thus, with the information processing apparatus, search processing based on a document registration tree can be performed in the same way as processing performed when "properties 2 and 3" of Bloom filters are used. In addition, with the information processing apparatus according to the present invention, since a value added to an index in relation to each document is stored in the deletion information storage unit, each document can be deleted easily. In addition, with the information processing apparatus according to the present invention, information used for searching all the documents is integrated into a single index. Namely, the information is not separated per document.

According to the present invention, the following modes are possible.

(Mode 1)

An information processing apparatus may be the information processing apparatus according to the above first aspect.

(Mode 2)

The registration unit may store information obtained by associating an encrypted text obtained by encrypting a search index generated for each of the plurality of documents with identification information about the document in the storage unit as deletion information for deleting the document.

(Mode 3)

The information processing apparatus may further comprise: a search request unit receiving a word and a key and generating a trapdoor for the word by using the key; and a search unit receiving the trapdoor, reading a search index for the plurality of documents and the tree structure from the storage unit, selecting a node closest to a root node among nodes to which a flag has not been allocated from the tree structure, and performing secure index determination based on identification information registered in the selected node, the trapdoor, and the search index; wherein the search unit repeats, until a flag is allocated to all the nodes included in the tree structure, processing for allocating a first flag to the node if the search unit determines that the word is included in a document identified by the identification information, and otherwise, allocating a second flag to the node and descendant node(s) of the node; and wherein the search unit outputs identification information registered in a node to which the first flag is allocated among the nodes included in the tree structure.

Mode (4)

The information processing apparatus may further comprise: a deletion unit that receives identification information for identifying a document that needs to be deleted and decoding information for cancelling the encryption, deletes the identification information from the tree structure, decodes encrypted text associated with the identification information in the deletion information by using the decoding information, obtains a search index generated for the document, and subtracts the obtained search index from a search index for the plurality of documents.

(Mode 5)

A first document may be updated to a second document by causing the deletion unit to delete the first document and causing the registration unit to register the second document.

(Mode 6)

The tree structure may be a binary tree structure.

(Mode 7)

The search unit may select a node from the tree structure based on a breadth-first search method.

(Mode 8)

The search unit may select a node from the tree structure based on a depth-first search method.

(Mode 9)

An information processing method may be the information processing method according to the above second aspect.

(Mode 10)

The information processing method may further comprise: storing information obtained by associating an encrypted text obtained by encrypting a search index generated for each of the plurality of documents with identification information about the document in the storage unit as deletion information for deleting the document.

(Mode 11)

The information processing method may further comprise: receiving a word and a key and generating a trapdoor for the word by using the key; selecting a node closest to a root node among nodes to which a flag has not been allocated from the tree structure and performing secure index determination based on identification information registered in the selected node, the trapdoor, and the search index for the plurality of documents, and repeating, until a flag is allocated to all the nodes included in the tree structure, processing for allocating a first flag to the node if it is determined that the word is included in a document identified by the identification information, and otherwise, allocating a second flag to the node and descendant node(s) of the node; and outputting identification information registered in a node to which the first flag is allocated among the nodes included in the tree structure.

(Mode 12)

The information processing method may further comprise: receiving identification information for identifying a document that needs to be deleted and decoding information for cancelling the encryption; and deleting the received identification information from the tree structure, decoding encrypted text associated with the identification information in the deletion information by using the decoding information, obtaining a search index generated for the document, and subtracting the obtained search index from a search index for the plurality of documents.

(Mode 13)

A program may be the program according to the above third aspect.

(Mode 14)

The program may cause the computer to execute: storing information obtained by associating an encrypted text obtained by encrypting a search index generated for each of the plurality of documents with identification information about the document in the storage unit as deletion information for deleting the document.

(Mode 15)

The program may cause the computer to execute: receiving a word and a key and generating a trapdoor for the word by using the key; selecting a node closest to a root node among nodes to which a flag has not been allocated from the tree structure and performing secure index determination based on identification information registered in the selected node, the trapdoor, and the search index for the plurality of documents, and repeating, until a flag is allocated to all the nodes included in the tree structure, processing for allocating a first flag to the node if it is determined that the word is included in a document identified by the identification information, and otherwise, allocating a second flag to the node and descendant node(s) of the node; and outputting identification information registered in a node to which the first flag is allocated among the nodes included in the tree structure.

(Mode 16)

The program may cause the computer to execute: receiving identification information for identifying a document that needs to be deleted and decoding information for cancelling the encryption; and deleting the received identification information from the tree structure, decoding encrypted text associated with the identification information in the deletion information by using the decoding information, obtaining a search index generated for the document, and subtracting the obtained search index from a search index for the plurality of documents.

(First Exemplary Embodiment)

An information processing apparatus according to a first exemplary embodiment will be described in detail with reference to the drawings.

FIG. 11 is a block diagram illustrating a configuration of an information processing apparatus 50 according to the present exemplary embodiment.

As illustrated in FIG. 11, an information processing apparatus 50 includes a registration unit 100 registering documents, a search request unit 200 generating information for performing keyword search, a search unit 300 performing keyword search, a deletion unit 400 deleting registered documents, and a storage unit 500 storing index information and the like.

In the present exemplary embodiment, a document includes identification information for identifying the document and a word set. A document registration tree is formed by data in a tree structure and has leaf nodes. Identification information is allocated to each leaf node. Data representing "not registered" is allocated to each leaf node to which no identification information has been registered, and a unique value is allocated to each internal node in the tree structure. A node set relating to a leaf node can be represented by a set of identification information about the nodes on the shortest path between the leaf node and a root node thereof.

The storage unit 500 includes an index storage unit 501, a document registration tree storage unit 502, and a deletion information storage unit 503.

The index storage unit 501 stores information about addition of index information generated for each registered document. The document registration tree storage unit 502 stores a tree structure having identification information about registered documents as leaf nodes. The deletion information storage unit 503 stores deletion information associated with each of the registered documents.

FIG. 12 is a block diagram illustrating a configuration of the registration unit 100. As illustrated in FIG. 12, the registration unit 100 includes a registration processing control unit 101 and a secure index generation unit 102. The registration unit 100 receives a key and a document to be registered and updates values stored in the storage unit 500.

The registration processing control unit 101 receives a document D and a key K and updates relevant values stored in the storage unit 500. The secure index generation unit 102 receives the key, node information, and a word set, generates a secure index based on the input content, and outputs the secure index.

Figure 13:
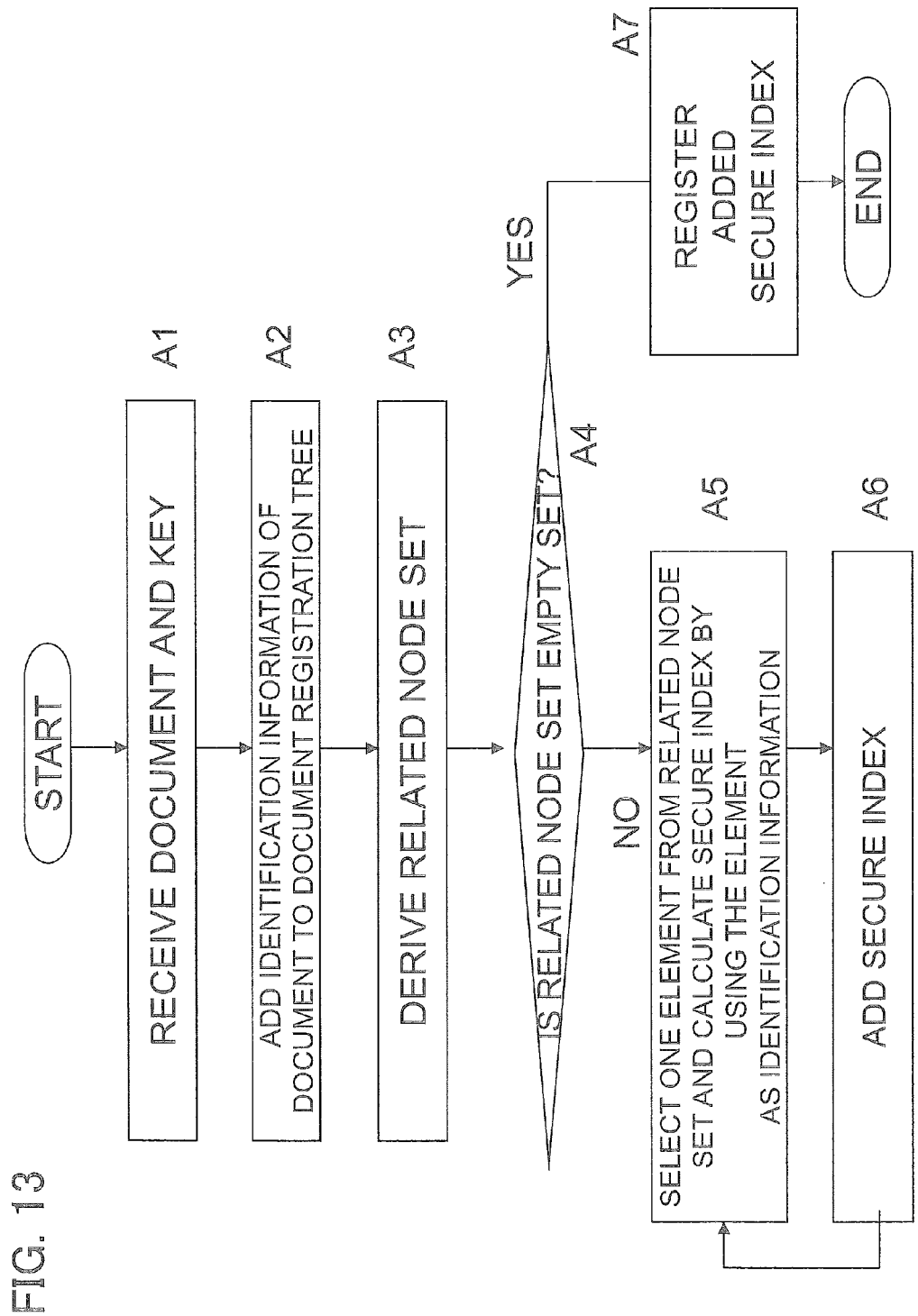
FIG. 13 is a flow chart illustrating an operation of the registration unit in the information processing apparatus according to the first exemplary embodiment.

FIG. 13 is a flow chart illustrating an operation of the registration unit 100. An operation of the registration unit 100 will be described with reference to FIG. 13.

The registration processing control unit 101 receives a document D including identification information D_id and a word set D_set and a key K (step A1). The registration processing control unit 101 reads a document registration tree from the document registration tree storage unit 502, selects a leaf node to which no identification information has been registered from the document registration tree, and rewrites "not registered" to the identification information D_id (step A2). Next, the registration processing control unit 101 derives a node set R={r_1, ... } relating to the leaf node to which the identification information D_id has been allocated (step A3) and stores the node set in an internal storage device (not illustrated). In addition, an area for storing a value obtained during processing is prepared in an internal storage device and the area is initialized. Next, the registration processing control unit 101 determines whether the related node set R is an empty set (step A4).

If the related node set R is not an empty set (NO in step A4), the registration processing control unit 101 deletes an element r_i in the related node set R and inputs the identification information r_i, the key K, and the word set D_set to the secure index generation unit 102. Based on the identification information, the key, and the word set, the secure index generation unit 102 generates and outputs a secure index (step A5). The registration processing control unit 101 receives the secure index generated by the secure index generation unit 102 and adds the secure index to the area for storing a value obtained during processing (step A6). Next, the operation returns to step A5.

In contrast, if the related node set R is an empty set (YES in step S4), the registration processing control unit 101 adds the value stored in the area for storing a value obtained during processing to an index stored in the index storage unit 501, associates this value with the identification information D_id, and stores the value and the identification information D_id in the deletion information storage unit 503 as deletion information (step A7).

Figure 14:
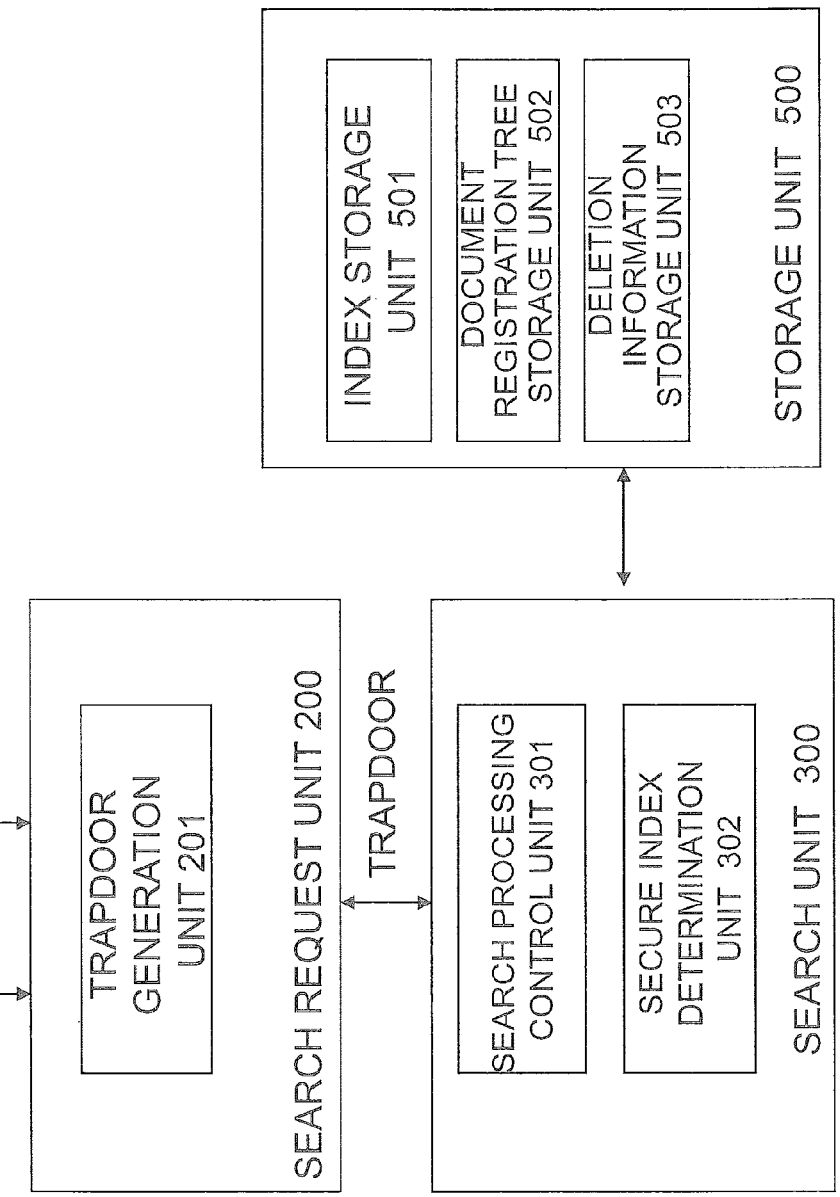
FIG. 14 is a block diagram illustrating a configuration of a search request unit and of a search unit in the information processing apparatus according to the first exemplary embodiment.

FIG. 14 is a block diagram illustrating a configuration of the search request unit 200 and of the search unit 300. As illustrated in FIG. 14, the search request unit 200 includes a trapdoor generation unit 201. The trapdoor generation unit 201 receives the key K and a word w and outputs a trapdoor t for the word w.

As illustrated in FIG. 14, the search unit 300 includes a search processing control unit 301 and a secure index determination unit 302 and outputs a set of identification information about documents.

The search processing control unit 301 receives the trapdoor t and outputs a plurality of items of identification information as a set. The secure index determination unit 302 receives the identification information, the trapdoor, and the index, performs secure index determination processing based on the input, and outputs a determination result.

Figure 15:
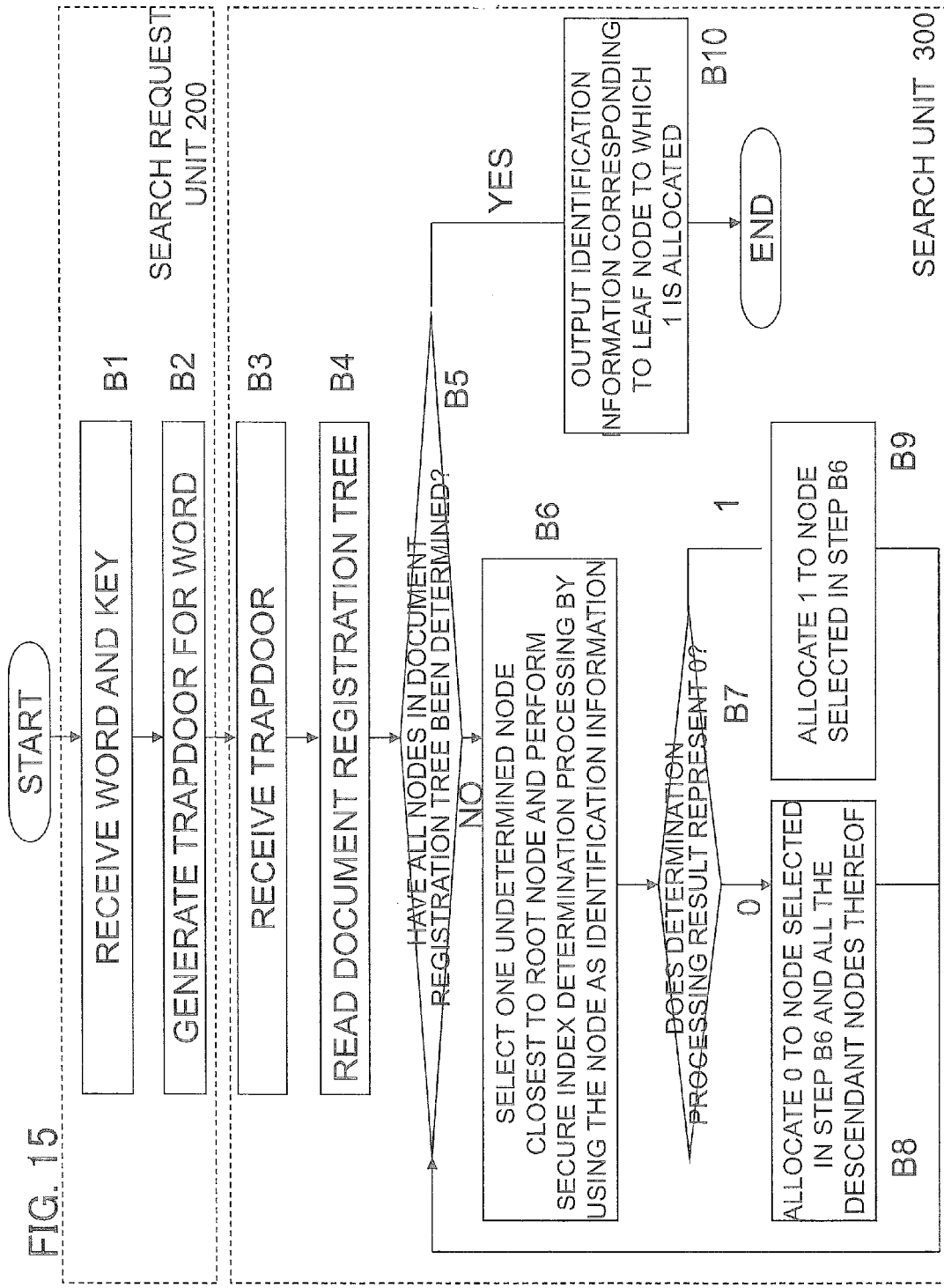
FIG. 15 is a flow chart illustrating an operation of the search request unit and of the search unit in the information processing apparatus according to the first exemplary embodiment.

FIG. 15 is a flow chart illustrating an operation of the search request unit 200 and of the search unit 300. An operation of the search request unit 200 and of the search unit 300 will be described with reference to FIG. 15. The search request unit 200 performs steps B1 and B2 in FIG. 15 and the search unit 300 performs steps B3 to B10.

The search request unit 200 receives the word w and the key K (step B1). The search request unit 200 receives the key K and generates a trapdoor t for the word w (step B2).

The search processing control unit 301 receives the trapdoor t (step B3). The search processing control unit 301 reads a document registration tree from the document registration tree storage unit 502 (step B4). The search processing control unit 301 determines whether all the leaf nodes in the document registration tree have been determined (step B5).

If undetermined nodes exist (NO in step B5), the search processing control unit 301 selects a node, to which determination information (for example, a flag) is not allocated and which is closest to the root node, from the nodes included in the document registration tree (step B6). The secure index determination unit 302 sets the identification information registered in the node to r, the trapdoor information to t, and a value stored in the index storage unit 501 to a secure index and performs secure index determination processing (step B6). If the determination processing result represents 0 ("0" in step B7), the search processing control unit 301 allocates flag 0 to the node r and all the descendant nodes thereof (step B8). If the determination processing result represents 1 ("1" in step B7), the search processing control unit 301 allocates flag 1 to the node (step B9).

If all the nodes included in the document registration tree have already been determined (YES in step B5), the secure index determination unit 302 outputs identification information corresponding to a leaf node to which flag 1 is allocated (step B10).

Figure 16:
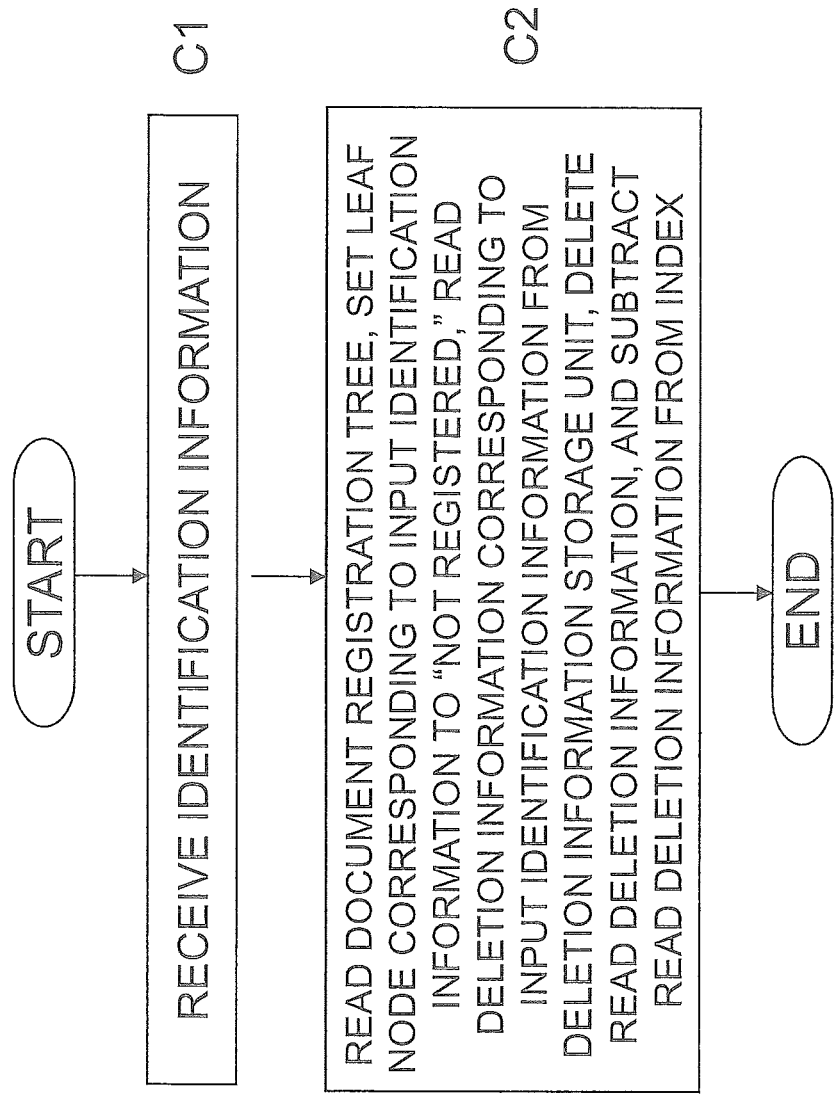
FIG. 16 is a flow chart illustrating an operation of a deletion unit in the information processing apparatus according to the first exemplary embodiment.

FIG. 16 is a flow chart illustrating an operation of the deletion unit 400. An operation of the deletion unit 400 will be described with reference to FIG. 16.

The deletion unit 400 receives identification information (step C1). Next, the deletion unit 400 reads a document registration tree, sets the leaf node corresponding to the input identification information to "not registered," reads deletion information corresponding to the input identification information from the deletion information storage unit, deletes the read deletion information, and subtracts the read deletion information from the index (step C2).

With the information processing apparatus 50 according to the present exemplary embodiment, since a secure index obtained by using each of the nodes from a root node to a leaf node in a document registration tree in relation to each document as identification information is added to an index, keyword search for a word included in documents can be processed accurately. Thus, according to the present exemplary embodiment, search processing based on a document registration tree can be performed in the same way as processing performed when "properties 2 and 3" of Bloom filters are used. In addition, in the present exemplary embodiment, since a value added to an index in relation to each document is stored in the deletion information storage unit, each document can be deleted easily.

In addition, with the information processing apparatus 50 according to the present exemplary embodiment, information used for searching all the documents is integrated into a single index. Namely, the information is not separated per document.

(Second Exemplary Embodiment)

Figure 17:
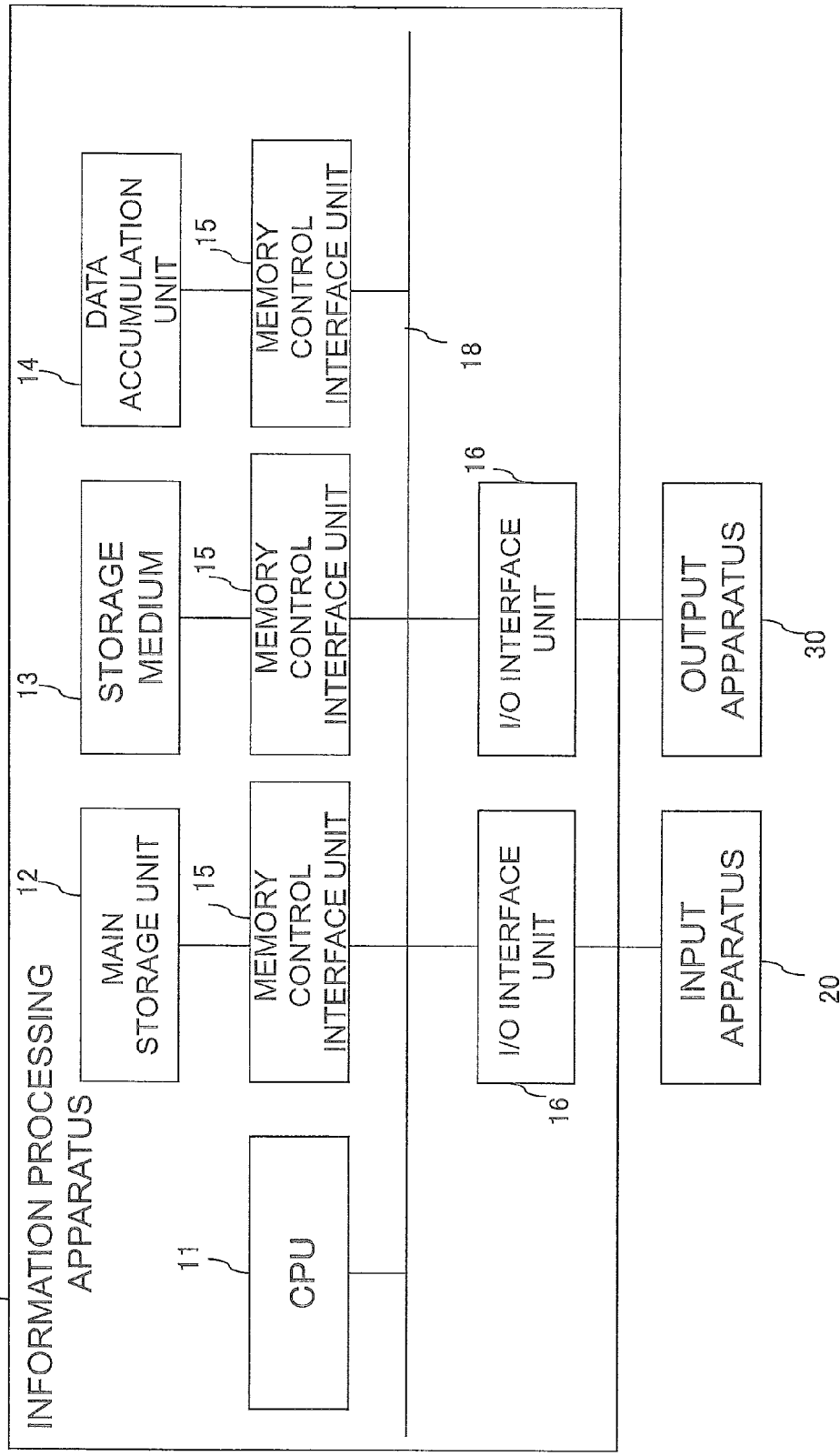
FIG. 17 is a block diagram illustrating a configuration of an information processing apparatus according to a second exemplary embodiment.

An information processing apparatus according to a second exemplary embodiment will be described in detail with reference to the drawings. FIG. 17 is a block diagram illustrating a configuration of an information processing apparatus 10 according to the present exemplary embodiment.

As illustrated in FIG. 17, the information processing apparatus 10 includes a CPU 11, a main storage unit 12 temporarily storing information necessary for processing by the CPU 11, a storage medium 13 storing a program causing the CPU 11 to perform processing by the registration unit 100, the search request unit 200, the search unit 300, the deletion unit 400, and the storage unit 500 of the information processing apparatus 50 (FIG. 11) according to the first exemplary embodiment and processing associated with the above processing, a data accumulation unit 14 storing values and the like stored in the index storage unit 501, memory control interface units 15 controlling forwarding of data output from and input to the main storage unit 12, the storage medium 13, and the data accumulation unit 14, respectively, and I/O interface units 16, which are interface devices with an input apparatus 20 and an output apparatus 30, respectively. These units are connected to each other via a bus. The data accumulation unit 14 is not necessarily arranged in the information processing apparatus 10. The data accumulation unit 14 may be arranged separately from the information processing apparatus 10.

The information processing apparatus 10 realizes the function of each of the registration unit 100, the search request unit 200, the search unit 300, the deletion unit 400, and the storage unit 500 of the information processing apparatus 50 according to the first exemplary embodiment.

The storage medium 13 may be a magnetic disk, a semiconductor memory, an optical disk, or another storage medium.

EXAMPLES

Next, a specific example of the information processing apparatus according to the above exemplary embodiment will be described.

The number of times of secure index generation processing required for registering each document is determined depending on a configuration of the document registration tree. To set the same number of times of generation processing for any document, it is only necessary to use a tree structure in which the number of nodes from the root node to any leaf node is constant. Examples of such tree structure include a binary tree structure. If such tree structure is used, when 2^n documents are registered, the number of times of secure index generation processing per document can be reduced to n.

In addition, for example, breadth-first search or depth-first search can be used for the tree structure determination sequence in the above search processing.

Since deletion information generated per document includes information about a document corresponding thereto, storing deletion information without modification is not desirable. Thus, it is desirable that deletion information be encrypted by a device registering the document before stored. In addition, it is desirable that, when deletion information is deleted, information necessary for decoding be transmitted along with the identification information. Since it is difficult to prepare a different key per document, a function for determining a key from a master key and identification information may be used. In this way, registration of documents can be managed easily. A key for generating a secure index may be determined based on the same method. In this case, since it is only necessary that a device registering documents store a master key value, the number of values to be managed can be reduced further.

By using the above deletion unit 400 and the registration unit 100 in this order, document update processing can also be realized.

With information processing apparatus according to the present invention, search for a word that is not included in registered documents can be performed efficiently. In addition, information about registered documents is not leaked from stored index information. By using the index generation method according to the present invention as a method for generating indexes in a database, it is possible to establish a database having resistance to information leakage.

The disclosure of each of the prior art including the above NPLs is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept.

10 information processing apparatus
11 CPU
12 main storage unit
13 storage medium
14 data accumulation unit
15 memory control interface unit
16 I/O interface unit
18 bus
20 input apparatus
30 output apparatus
50 information processing apparatus
100 registration unit
101 registration processing control unit
102 secure index generation unit
111 reception unit
112 identification information registration unit
113 index registration unit
200 search request unit
201 trapdoor generation unit
300 search unit
301 search processing control unit
302 secure index determination unit
400 deletion unit
500 storage unit
501 index storage unit
502 document registration tree storage unit
503 deletion information storage unit

What is claimed is:

1. An information processing apparatus, comprising:
    a storage unit that stores instructions to be executed by a processor of a computer regarding a tree structure formed by nodes, each of which stores identification information identifying a document;
    a registration unit, as executed by the processor on the computer, that registers documents in the storage unit, wherein the registration unit comprises:
        a reception unit that receives a document including identification information identifying the document and a word set and a key;
        an identification information registration unit that registers received identification information in a leaf node in the tree structure;
        a secure index generation unit that calculates a secure index corresponding to identification information registered in each node from a root node to the leaf node in the tree structure based on the word set and the key and generates a value calculated by adding the calculated secure index as a search index for the document; and an index registration unit that computes a value by adding a plurality of search indexes generated respectively for a plurality of received documents, and stores the value in the storage unit as a single index for the plurality of received documents, and wherein the index registration unit stores information obtained by associating an encrypted text obtained by encrypting a search index generated for each of the plurality of documents with identification information about the document in the storage unit as deletion information for deleting the document; and a deletion unit that receives identification information for identifying a document that needs to be deleted and decoding information for cancelling the encryption, deletes the identification information from the tree structure, decodes encrypted text associated with the identification information in the deletion information by using the decoding information, obtains a search index generated for the document, and subtracts the obtained search index from a search index for the plurality of documents.

2. The information processing apparatus according to claim 1, further comprising:

a search request unit receiving a word and the key and generating a trapdoor for the word by using the key; and a search unit receiving the trapdoor, reading a search index for the plurality of documents and the tree structure from the storage unit, selecting a node closest to a root node among nodes to which a flag has not been allocated from the tree structure, and performing secure index determination based on identification information registered in the selected node, the trapdoor, and the search index, wherein the search unit repeats, until a flag is allocated to all the nodes included in the tree structure, processing for allocating a first flag to the node if the search unit determines that the word is included in a document identified by the identification information, and otherwise, allocating a second flag to the node and descendant node(s) of the node, and wherein the search unit outputs identification information registered in a node to which the first flag is allocated among the nodes included in the tree structure.

3. The information processing apparatus according to claim 1, wherein a first document is updated to a second document by causing the deletion unit to delete the first document and causing the registration unit to register the second document.

4. The information processing apparatus according to claim 1, wherein the tree structure comprises a binary tree structure.

5. The information processing apparatus according to claim 2, wherein the search unit selects a node from the tree structure based on a breadth-first search method.

6. The information processing apparatus according to claim 2, wherein the search unit selects a node from the tree structure based on a depth-first search method.

7. An information processing method, comprising:

receiving a document including identification information identifying the document and a word set and a key;

registering received identification information in a leaf node in a tree structure formed by nodes, each of which stores identification infoiniation identifying a document;

calculating a secure index corresponding to identification information registered in each node from a root node to the leaf node in the tree structure based on the word set and the key and generating a value calculated by adding the calculated secure index as a search index for the document;

computing a value by adding a plurality of search indexes generated respectively for a plurality of received documents, and storing the value in a storage unit as a single index for the plurality of received documents;

storing information obtained by associating obtained by encrypting the search index generated for each of the plurality of documents with identification information about the document in the storage unit as deletion information for deleting the document;

receiving identification information for identifying a document that needs to be deleted and decoding information for cancelling the encryption; and deleting the received identification information from the tree structure, decoding encrypted text associated with the identification information in the deletion information by using the decoding information, obtaining a search index generated for the document, and subtracting the obtained search index from a search index for the plurality of documents.

8. The information processing method according to claim 7, further comprising:

receiving a word and the key and generating a trapdoor for the word by using the key;

selecting a node closest to the root node among nodes to which a flag has not been allocated from the tree structure and performing secure index determination based on identification information registered in the selected node, the trapdoor, and the search index for the plurality of documents, and repeating, until a flag is allocated to all the nodes included in the tree structure, processing for allocating a first flag to the node if it is determined that the word is included in a document identified by the identification information, and otherwise, allocating a second flag to the node and descendant node(s) of the node; and outputting identification information registered in a node to which the first flag is allocated among the nodes included in the tree structure.

9. A non-transient computer-readable storage medium, storing a program that causes a computer to execute:

receiving a document including identification information identifying the document and a word set and a key;

registering received identification information in a leaf node in a tree structure formed by nodes, each of which stores identification information identifying a document;

calculating a secure index corresponding to identification information registered in each node from a root node to the leaf node in the tree structure based on the word set and the key and generating a value calculated by adding the calculated secure index as a search index for the document;

computing a value by adding a plurality of the search indexes generated respectively for a plurality of received documents, and storing the value in a storage unit as a single index for the plurality of received documents;

storing information obtained by associating an encrypted text obtained by encrypting a search index generated for each of the plurality of documents with identification information about the document in the storage unit as deletion information for deleting the document;

receiving identification information for identifying a document that needs to be deleted and decoding information for cancelling the encryption; and deleting the received identification information from the tree structure, decoding encrypted text associated with the identification information in the deletion information by using the decoding information, obtaining a search index generated for the document, and subtracting the obtained search index from a search index for the plurality of documents.

10. The non-transient computer-readable storage medium according to claim 9, wherein the program further causes the computer to execute:

receiving a word and the key and generating a trapdoor for the word by using the key;

selecting a node closest to the root node among nodes to which a flag has not been allocated from the tree structure and performing secure index determination based on identification information registered in the selected node, the trapdoor, and the search index for the plurality of documents, and repeating, until a flag is allocated to all the nodes included in the tree structure, processing for allocating a first flag to the node if it is determined that the word is included in a document identified by the identification information, and otherwise, allocating a second flag to the node and descendant node(s) of the node; and outputting identification information registered in a node to which the first flag is allocated among the nodes included in the tree structure.

* * * * *